United States Patent
Henry et al.

(10) Patent No.: US 8,211,262 B2
(45) Date of Patent: Jul. 3, 2012

(54) METHOD OF USING A WELDING MACHINE INCORPORATING A VACUUM TRACK ASSEMBLY

(75) Inventors: Brian D. Henry, North Lawrence, OH (US); Vincent L. Haley, Lawrence, MI (US)

(73) Assignee: Miller Weldmaster Corporation, Navarre, OH (US)

( * ) Notice: Subject to any disclaimer, the term of this patent is extended or adjusted under 35 U.S.C. 154(b) by 0 days.

(21) Appl. No.: 13/113,316

(22) Filed: May 23, 2011

(65) Prior Publication Data

US 2011/0220282 A1 Sep. 15, 2011

Related U.S. Application Data

(62) Division of application No. 12/577,604, filed on Oct. 12, 2009, now Pat. No. 7,971,617.

(51) Int. Cl.
*B32B 37/10* (2006.01)

(52) U.S. Cl. .............. 156/272.2; 156/157; 156/322; 156/382

(58) Field of Classification Search ............ 156/157, 156/502, 322, 497, 499, 381, 382
See application file for complete search history.

(56) References Cited

U.S. PATENT DOCUMENTS

| | | | |
|---|---|---|---|
| 2,844,186 A | 7/1958 | Sunnen, Jr. | |
| 3,957,567 A | 5/1976 | Pursell et al. | |
| 4,121,964 A | 10/1978 | Berkowitz et al. | |
| 4,501,630 A | 2/1985 | Kiuchi | |
| 5,085,719 A * | 2/1992 | Eck ........................... | 156/73.4 |
| 5,447,588 A | 9/1995 | Merz et al. | |
| 5,571,371 A | 11/1996 | Senbokuya | |
| 5,679,195 A | 10/1997 | O'Dwyer et al. | |
| 5,913,991 A * | 6/1999 | Kubota et al. .............. | 156/64 |
| 6,342,118 B1 | 1/2002 | Ward | |
| 6,939,436 B2 | 9/2005 | Prenat | |
| 7,331,368 B2 * | 2/2008 | Gajewski et al. ............ | 156/515 |
| 7,975,633 B2 * | 7/2011 | Henry et al. ............ | 112/470.12 |

* cited by examiner

*Primary Examiner* — Khanh P Nguyen
*Assistant Examiner* — Vishal I Patel
(74) *Attorney, Agent, or Firm* — Sand & Sebolt

(57) ABSTRACT

A welding machine having a frame that includes end supports spanned by a top beam with a truncated V-shaped cross-section and a method of using the same. A vacuum track assembly disposed vertically beneath the top beam retains fabrics to be welded on a perforated surface using suction. A welding head travels along the top beam and applies heat and pressure to the surface to weld the fabrics together. The top beam and vacuum track assembly are extendable by including additional unit segments from which the beam and assembly are constructed.

22 Claims, 21 Drawing Sheets

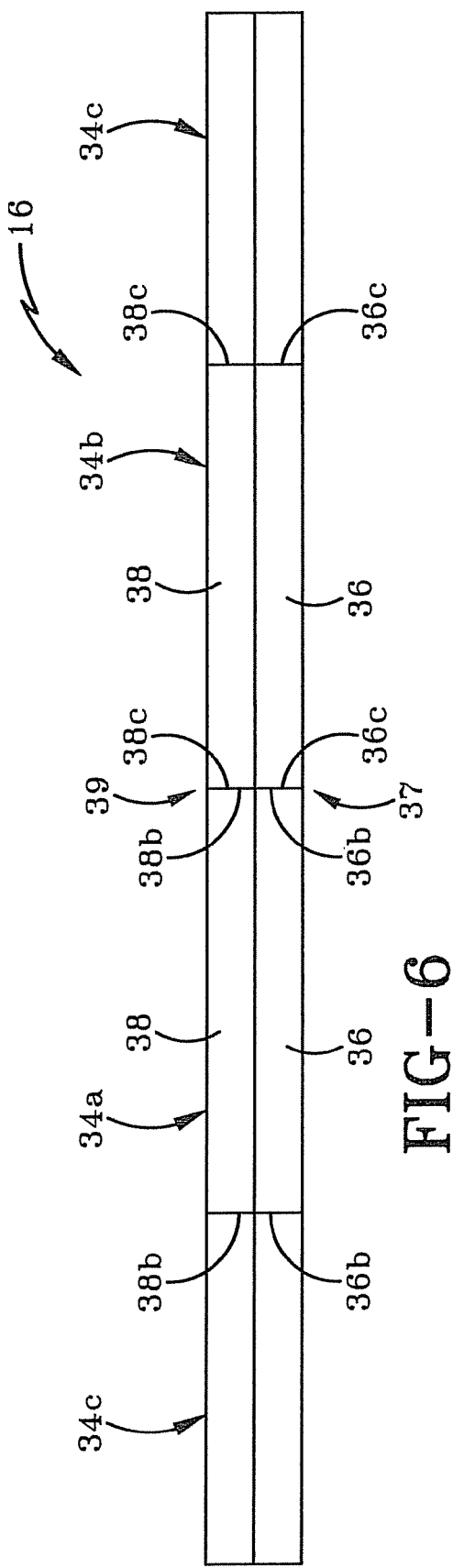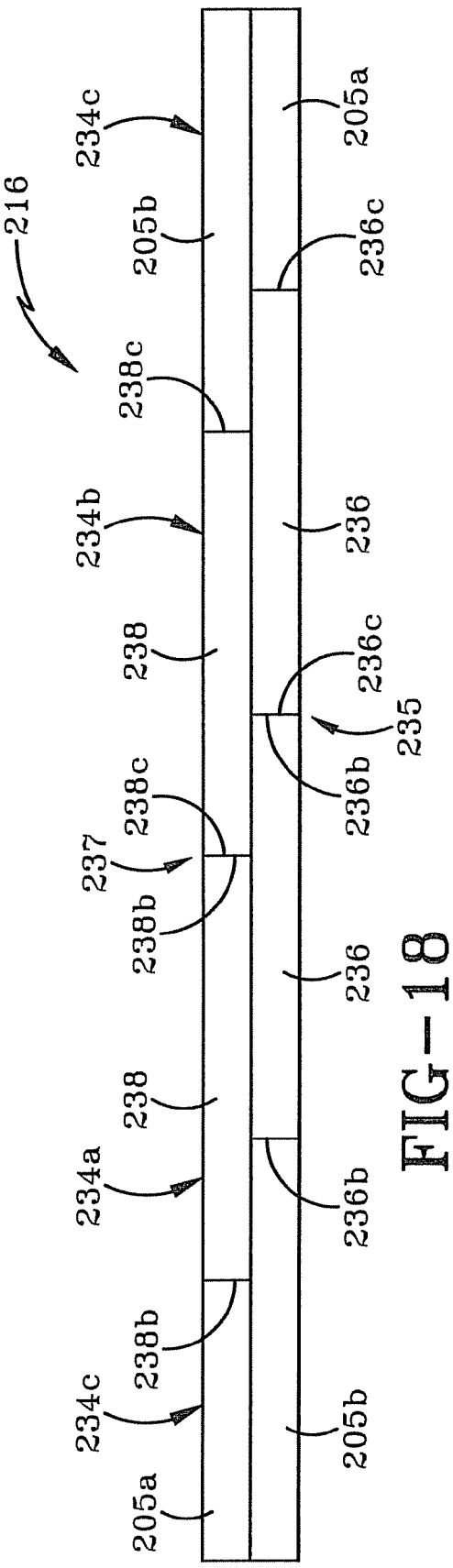

METHOD OF USING A WELDING MACHINE INCORPORATING A VACUUM TRACK ASSEMBLY

CROSS-REFERENCE TO RELATED APPLICATIONS

This application is a divisional of U.S. patent application Ser. No. 12/577,604, filed Oct. 12, 2009; the disclosure of which is incorporated herein by reference.

BACKGROUND OF THE INVENTION

1. Technical Field

This invention generally relates to welding machines. More particularly, the invention relates to welding machines that are used to weld flexible sheet materials together. Specifically, the invention relates to a fabric welding machine and a method of using the same that includes an expandable top beam for supporting a welding head in an appropriate position over an expandable vacuum track assembly, where the vacuum track assembly utilizes suction to retain the fabrics to be welded in an immobilized position beneath the welding head.

2. Background Information

Heat welding has long been used to join waterproof sheet materials together to manufacture a variety of products such as tents, tarpaulins, liners for pools and landfills, awnings and others. During the manufacturing process, two pieces of sheet material are overlapped and a combination of heat and pressure is applied to the overlapped region to weld the materials together and create a seam. This procedure permits longer pieces of the waterproof sheet materials to be produced so that the end product can be manufactured out of the same.

Various techniques have been developed to join sheet materials of this nature together. These include hot air welding, hot wedge welding and impulse welding. In hot air welding a nozzle is positioned so as to blow heated air between the two layers of sheet material. Typically, for a thermoplastic sheet material, the temperatures involved range anywhere from 200° F. to 1,350° F. (90° C. to 750° C.). Once the heat has been introduced between the layers, a roller passes over the same, applying a preset level of pressure to the layers. The combination of the heat and pressure joins the materials together. Hot air welding requires precise temperatures and pressure to be applied to the sheet materials and also requires that the process be done in a timely fashion in order to prevent cooling of the sheet materials before the roller passes over the same. If the temperature or pressure is off, the weld will not be complete and the materials may separate from each other.

Hot wedge welding is fairly similar to hot air welding with the exception that instead of a nozzle being used to introduce heat into the system, a heated wedge is used. The wedge is positioned so that the fabric layers are pulled over the wedge immediately before they are contacted by the rollers. Wedges are typically heated to a temperature of between 200° F. and 920° F. (90° C. and 490° C.). Once again, the temperature, pressure and time have to be closely monitored in order to create a good seam.

Some of the problems surrounding welding of a first and a second fabric panel together by any of the above mechanisms are the need to apply heat and pressure in a consistent zone on the fabric panels and the need to keep the panels immobilized during the application of heat and pressure thereto. If either of the panels move, or the heat or pressure is not applied in a consistent area on the panels, the quality of the seam so produced will suffer.

There is therefore a need in the art for an improved fabric welding machine that more consistently applies heat and pressure to a region of fabric panels that are to be welded together, and provides mechanisms for immobilizing those fabric panels as they are welded.

SUMMARY OF THE INVENTION

The device of the present invention comprises a welding machine having a frame that includes end supports spanned by a top beam with a truncated V-shaped cross-section. The shape of the top beam aids in keeping a welding head centered over a welding zone within the machine and therefore aids in more consistently applying heat and pressure to fabric panels being welded together. A vacuum track assembly is disposed vertically beneath the top beam and this assembly retains the fabric panels that are to be welded together on a perforated surface using suction. The welding head travels along the top beam and applies heat and pressure to the surface of the fabric panels to weld the same together. The top beam and vacuum track assembly may be varied in length by securing an appropriate number of beam segments and vacuum track segments together in end-to-end relationship.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 6 is a diagrammatic top view of the top beam showing the aligned side wall connections between adjacent pairs of beam segments;

FIG. 18 is a diagrammatic top view of the top beam of FIG. 15 showing the offset side wall connections between adjacent pairs of beam segments;

DETAILED DESCRIPTION OF THE INVENTION

Figure 1:
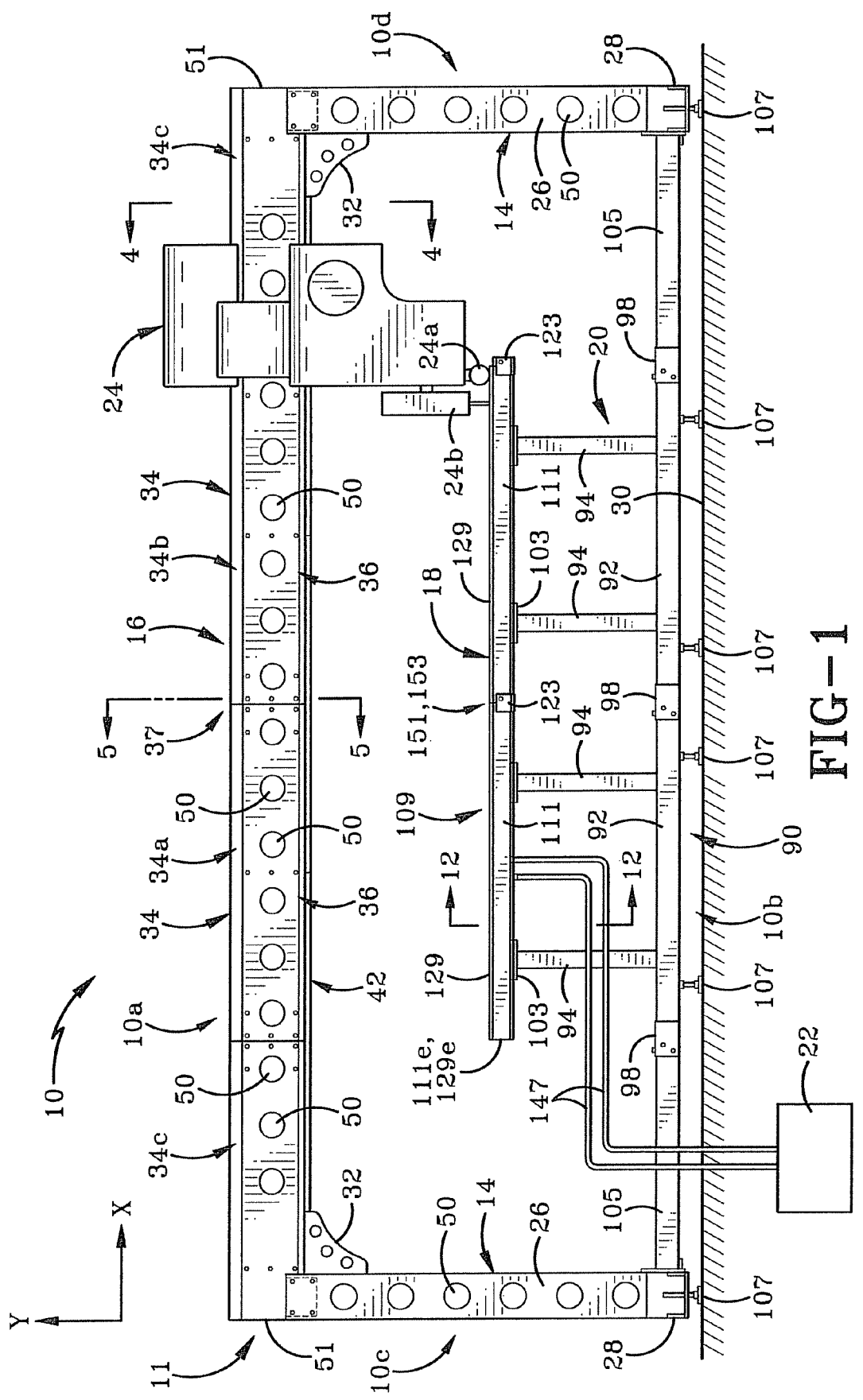
FIG. 1 is a front elevation of a welding machine in accordance with the present invention.
Figure 4:
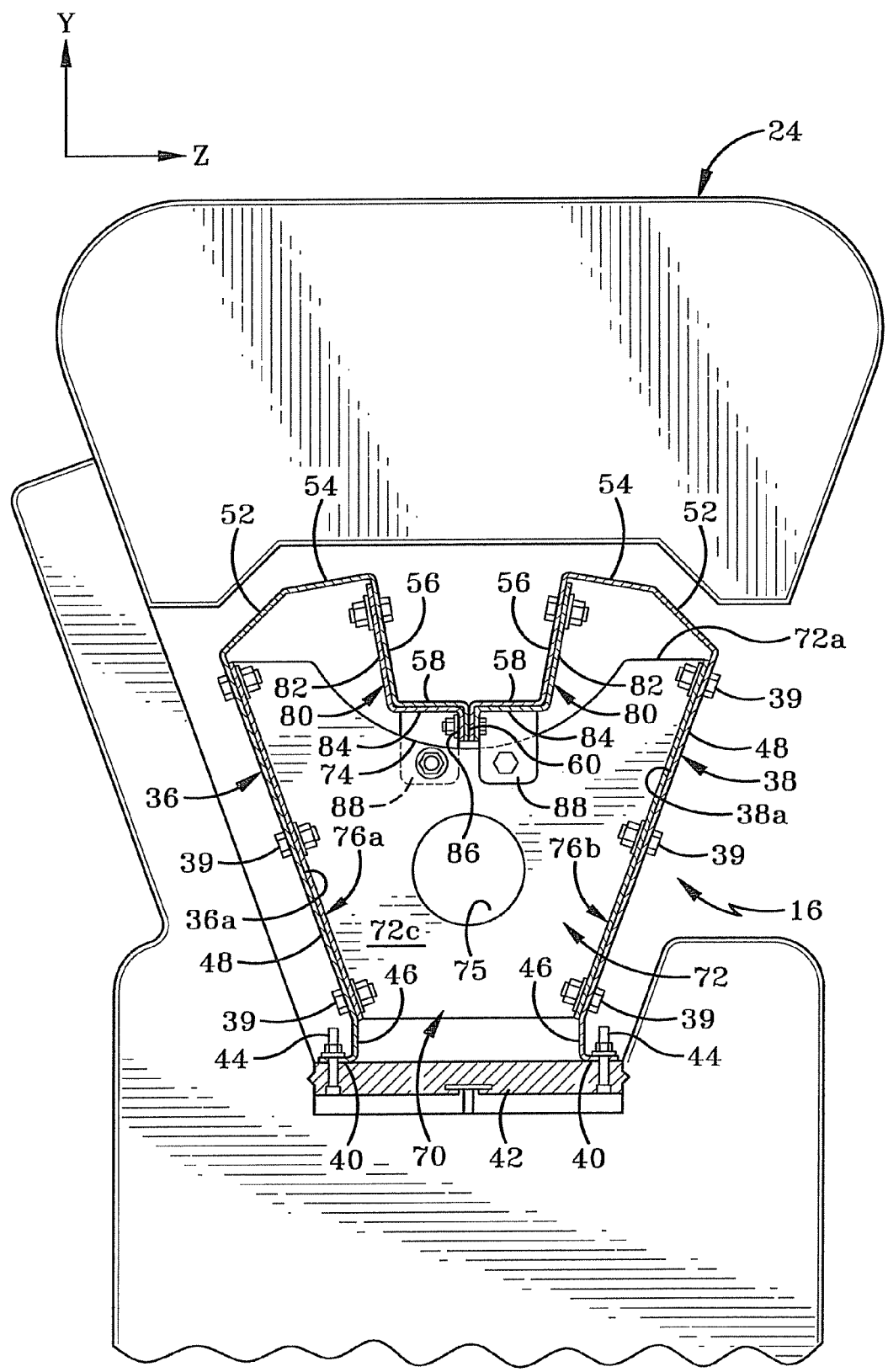
FIG. 4 is a cross-sectional side view of the top beam taken through line 4-4 of FIG. 1 and showing the welding head engaged therewith.

Referring to FIG. 1 there is shown a welding machine in accordance with the present invention and generally indicated at 20. In describing the present invention, it may be advantageous to first define longitudinal, lateral, and vertical directions positioned to be substantially mutually orthogonal. The vertical axis "Y" (FIGS. 1 & 4) extends from the top 10a of the machine 10 to the bottom 10b thereof. The longitudinal axis "X" extends from a first side 10c of the machine to a second side 10d thereof. The lateral axis "Z" is shown in FIG. 4 and extends from the front of the machine to the back thereof.

Machine 10 comprises a frame assembly 11 having two spaced apart vertical end supports 14, a top beam 16 that spans the end supports 14, a base assembly 20 that spans the end supports 14 and is disposed a distance vertically beneath top beam 16, and a vacuum track assembly 18 disposed vertically beneath top beam 16 and mounted on base assembly 20. Vacuum track assembly 18 may or may not span the distance between end supports 14. All of top beam 16, vacuum track assembly 18 and base assembly 20 are therefore vertically aligned with each other and extend longitudinally between end supports 14. A vacuum source 22 is operationally connected to the vacuum track assembly 18. A welding head 24 is mounted on top beam 16 in such a manner that it is disposed vertically above at least a portion of the vacuum track assembly and is reciprocally movable along top beam 16 during welding operations. Welding head 24 includes a roller 24a and an air nozzle 24b. Air nozzle 24b is used to provide heat to fabrics positioned on vacuum track assembly 18 and roller 24a is used to apply pressure to the fabrics and thereby weld the same together.

Although not illustrated in the attached figures for the sake of clarity, it will be understood that welding machine 10 preferably also includes a central processing unit, a digital control panel, laser optical alignment devices, cutting devices, sealing tape dispensers, as well as any other equipment that simplifies and enhances the welding process. It will also be understood that machine 10 is operationally connected to a suitable power supply for driving welding head 24 along top beam 16 and powering any of the aforementioned other devices.

Each end support 14 comprises a vertical upright 26 that extends upwardly from a horizontally-oriented base 28. Each base 28 rests upon a floor surface 30 and preferably is provided with leveling mechanisms 107 to enable machine 10 to be leveled on floor surface 30. Alternatively, bases 28 may be bolted to the floor surface 30. End supports 14 preferably are generally rectangular in cross-section and may includes a plurality of apertures 50 spaced at intervals. Apertures 50 decrease the overall weight of supports 14 without compromising the strength of the same.

Top beam 16 extends between the upper ends of the two vertical uprights 26 and is fixedly secured thereto by any suitable means such as by welding or bolts. A strengthening gusset 32 extends between a bottom surface of each end of top beam 16 and a side wall of upright 26. In accordance with one of the specific features of the present invention, top beam 16 is comprised of a crossbeam 42 and a plurality of beam segments 34. Crossbeam 42 spans end supports 14 and the beam segments 34 are secured to crossbeam 42 and are connected end-to-end to each other. The length of crossbeam 42 and the number of beam segments 34 utilized in welding machine 10 is determined by the type of welding operation for which the manufacturer intends to use the machine. If the fabric to be welded is relatively short, then a shorter crossbeam 42 will be used and fewer beam segments 34 will be secured thereto (see FIG. 1). If the fabric to be welded is relatively long, then a longer crossbeam 42 and more beam segments 34 will be incorporated into the machine (see FIG. 23). Top beam 16 preferably includes a guidance track that is mounted on or forms part of crossbeam 42. The welding head 24 engages this guidance track and is able to travel back and forth along top beam 16 between end supports 14. All of the beam segments 34 used in welding machine 10 are substantially identical to each other, except for the two end beam segments 34a that connect to uprights 26. The overall cross-sectional shape of top beam 16, which will be discussed hereinafter, aids in keeping welding head 24 centered on the beam and correctly positioned to travel over the portion of the vacuum track assembly 18 upon which the fabric is to be welded.

Referring to FIGS. 2-7, there is shown a single beam segment 34 that is securable to crossbeam 42. Each beam segment 34 includes a first side wall 36 and a second side wall 38 that are connected to each other using one or more splice brackets 70 as will be hereinafter described. First and second side walls 36, 38 are substantially identical components that are oriented so as to be mirror images of each other about a longitudinal centerline "A" (FIG. 4) which extends substantially parallel to the longitudinal axis "X" of the top beam 16. First and second side walls 36, 38 are secured a spaced lateral distance from each other on the upper surface of crossbeam 42. In describing first and second wall segments 36, 38, the term "top" will be used to describe surfaces that are disposed closer to the top end 10a of machine 10. The term "bottom" will be used to describe surfaces that are disposed closer to the bottom end 10b of machine 10. The term "inner" will be used to describe surfaces that are closer to the centerline "A" of top beam, and the term "outer" will be used to describe surfaces that are further away from the centerline "A". Furthermore, the term "outwardly" will be used to describe a direction that moves away from the centerline "A" of crossbeam 42 toward one of the sides 42c or 42d thereof. The term "inwardly" will be used to describe a direction that moves away from one of the sides 42c or 42d and toward the centerline "A". The term "upwardly" describes movement in a direction toward the top end 10a of machine 10 and the term "downwardly" describes movement in a direction toward the bottom end 10b of machine 10.

Both of first and second side walls 36, 38 include a first wall section 40 that is substantially planar in nature and is oriented substantially horizontally when secured to the upper surface 42a (FIG. 5) of crossbeam 42. First wall section 40 has a top surface, a bottom surface, an outer end 40a and an inner end 40b. The bottom surface abuts upper surface 42a of crossbeam 42 and is fixedly secured thereto by any suitable means such as bolts 44. It will be understood that rivets, welds, screws or any other type of fastening device may be used instead of bolts 44. When installed on crossbeam 42, first wall section 40 is oriented substantially parallel to the lateral axis "Z" of welding machine 10 and has outer end 40a thereof disposed proximate the associated side 42c, 42d of crossbeam 42. Inner end 40b of first wall section 40 is disposed a distance inwardly from the associated side 42c, 42d.

A second wall section 46 extends vertically upwardly from inner end 40b of first wall section 40 and terminates in a top end 46a. Second wall section 46 is disposed substantially at right angles relative to top surface of first wall section 40 and is therefore substantially parallel to vertical axis "Y".

Figure 2:
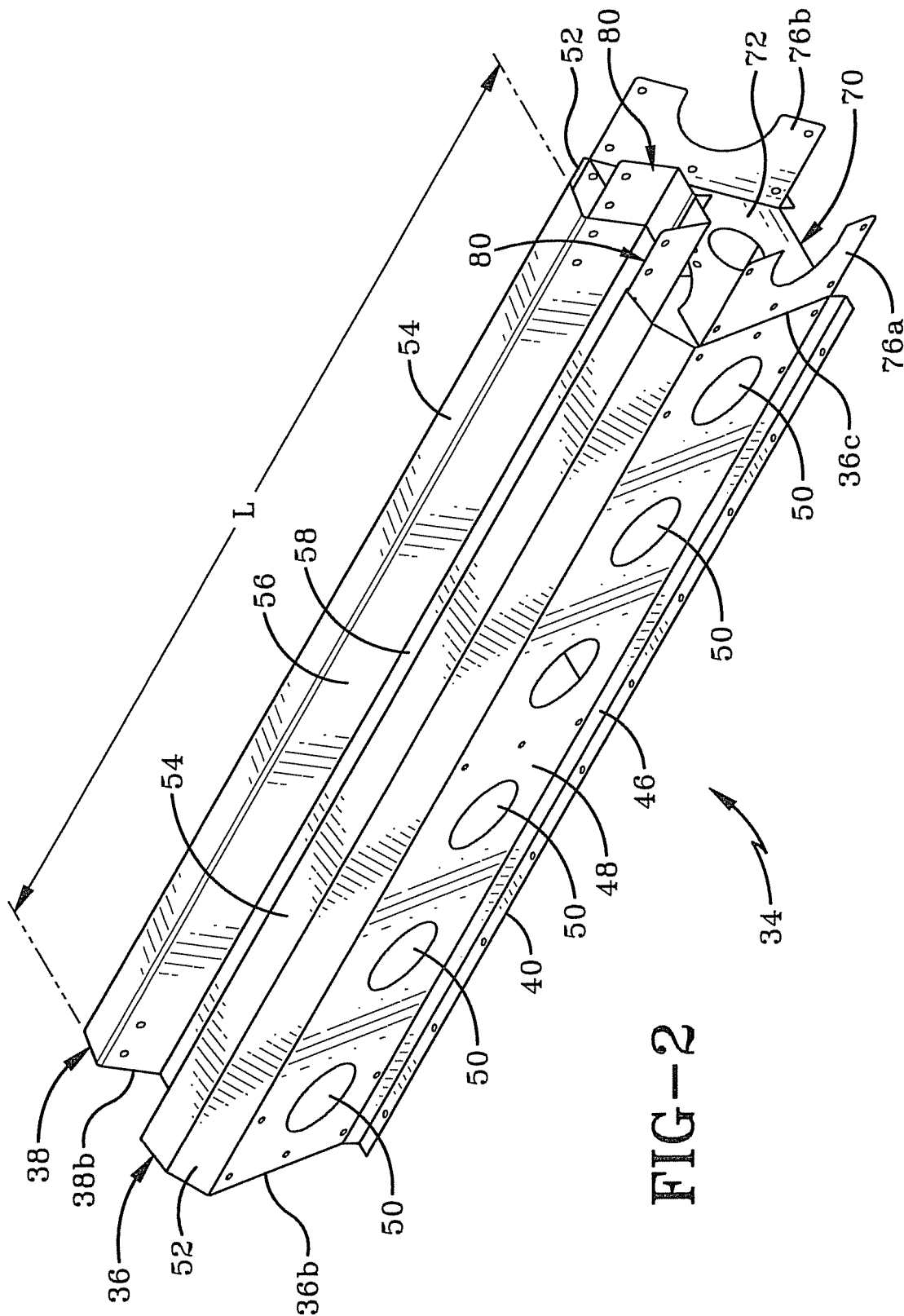
FIG. 2 is perspective view of a first embodiment of a beam segment utilized in the top beam of the welding machine of FIG. 1.
Figure 5:
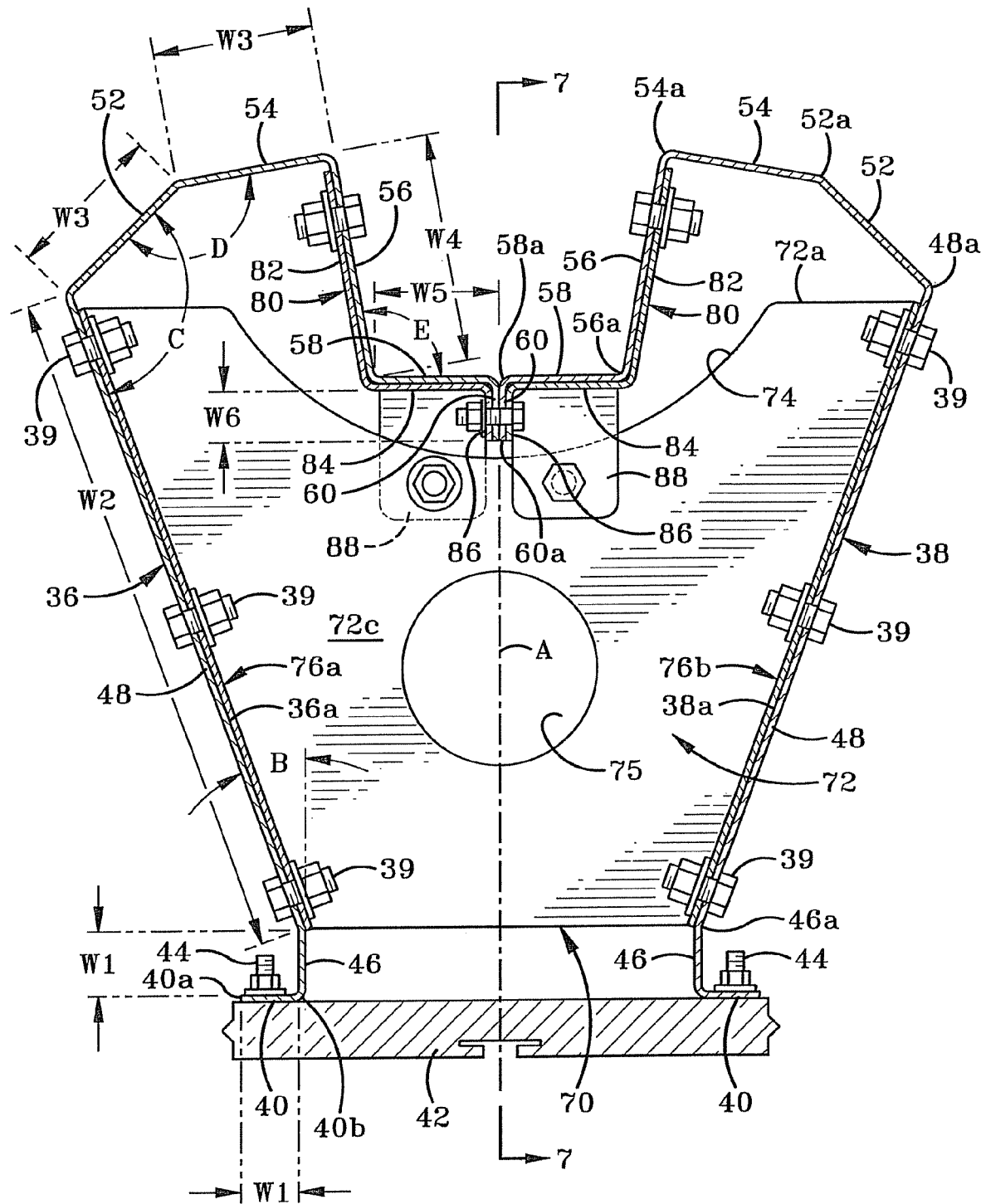
FIG. 5 is a cross-sectional side view of the top beam taken through line 5-5 of FIG. 1.

A third wall section 48 extends upwardly and outwardly away from top end 46a of second wall section 46 and terminates in a top end 48a. Third wall section 48 is disposed at an angle "B" of around 110 degrees relative to the inner wall of second wall section 46. Thus, third wall section 58 flares outwardly away from centerline "A" of top beam 16 (FIG. 5). When both of the first and second side walls 36, 38 are secured to crossbeam 42, the top beam 16 has a generally truncated V-shape in cross-section. This shape is primarily the result of the orientation of third wall sections 48 of first and second side walls 36, 38. Third wall section 48 defines a plurality of spaced apart apertures 50 therein (FIG. 2). Apertures 50 are provided so as to reduce the overall weight of top beam 16 without compromising the strength of the same.

A fourth wall section 52 extends upwardly and inwardly away from top end 48a of third wall section 48 and terminates in a top end 52a. Fourth wall section 52 is disposed at an angle "C" of around 115 degrees relative to the inner wall of third wall section 48 and extends inwardly toward the centerline "A" of top beam 16.

A fifth wall section 54 extends upwardly and inwardly away from a top end 52a of fourth wall section 52 and terminates in a top end 54a. Fifth wall section 54 is disposed at an angle "D" of around 35 degrees relative to the inner surface of fourth wall section 52.

A sixth wall section 56 extends downwardly and inwardly from top end 54a of fifth wall section 54 and terminates in a bottom end 56a. Sixth wall section 56 is disposed at an angle of around 90 degrees relative to the inner surface of fifth wall section, and the sixth wall section 56 extends generally inwardly toward the centerline "A".

A seventh wall section 58 extends inwardly toward the centerline "A" from bottom end 56a of sixth wall section 56 and terminates in an inner end 58a. Seventh wall section 58 is disposed at an angle "E" of around 100 degrees relative to the inner surface of sixth wall section 56.

Finally, an eighth wall section 60 extends downwardly from the inner end 58a end of seventh wall section 58 and terminates in a bottom end 60a. Eighth wall section 60 is disposed at an angle of around 90 degrees relative to the bottom surface of seventh wall section 58.

In a preferred embodiment of the invention, first wall section 40 and second wall section 46 are substantially of the same width "W1" and that width is around 1 inch. Third wall section 48 is of a width "W2" of around 10½ inches. Each of fourth wall section 52 and fifth wall section 54 are of a width "W3" of around 2½ inches. Sixth wall section 56 is of a width "W4" of around 3½ inches. Seventh wall section 58 is of a width "W5" of around 2 inches and eighth wall section 60 is of a width "W6" of around 1 inch. The overall length "L" of each beam segment 34 is around 59 inches.

One or more internal braces 62 extend between the interior surfaces 36a, 38a of first and second side walls 36, 38 of beam segment 34. Each brace 62 comprises a plate 64 that is generally a truncated V-shape that is complementary to the shape defined between the third wall sections 48 of first and second side walls 36, 38. A top end 64a of plate 64 includes a semicircular depression 66 and an aperture 67 is defined centrally in plate 64. First and second flanges 68a, 68b extend outwardly in the same direction from the side edges of plate 64. Flanges 68a, 68b are generally rectangular in shape and are disposed so as to abut the interior surfaces 36a, 36b of the side walls 36, 38. Flanges 68a, 68b are secured to side walls 36, 38 by a suitable means such as bolts.

Top beam 16 may be manufactured out of any number of beam segments 34 that will give the manufacturer of the welded fabrics the desired processing length in machine 10 as defined between the two end supports 14. Thus, if a shorter processing length is required for welding of any particular article of manufacture, then fewer beam segments 34 will be joined together to make up top beam 16. If a longer processing length is required, then more beam segments 34 will be joined together to make up top beam 16.

Figure 3:
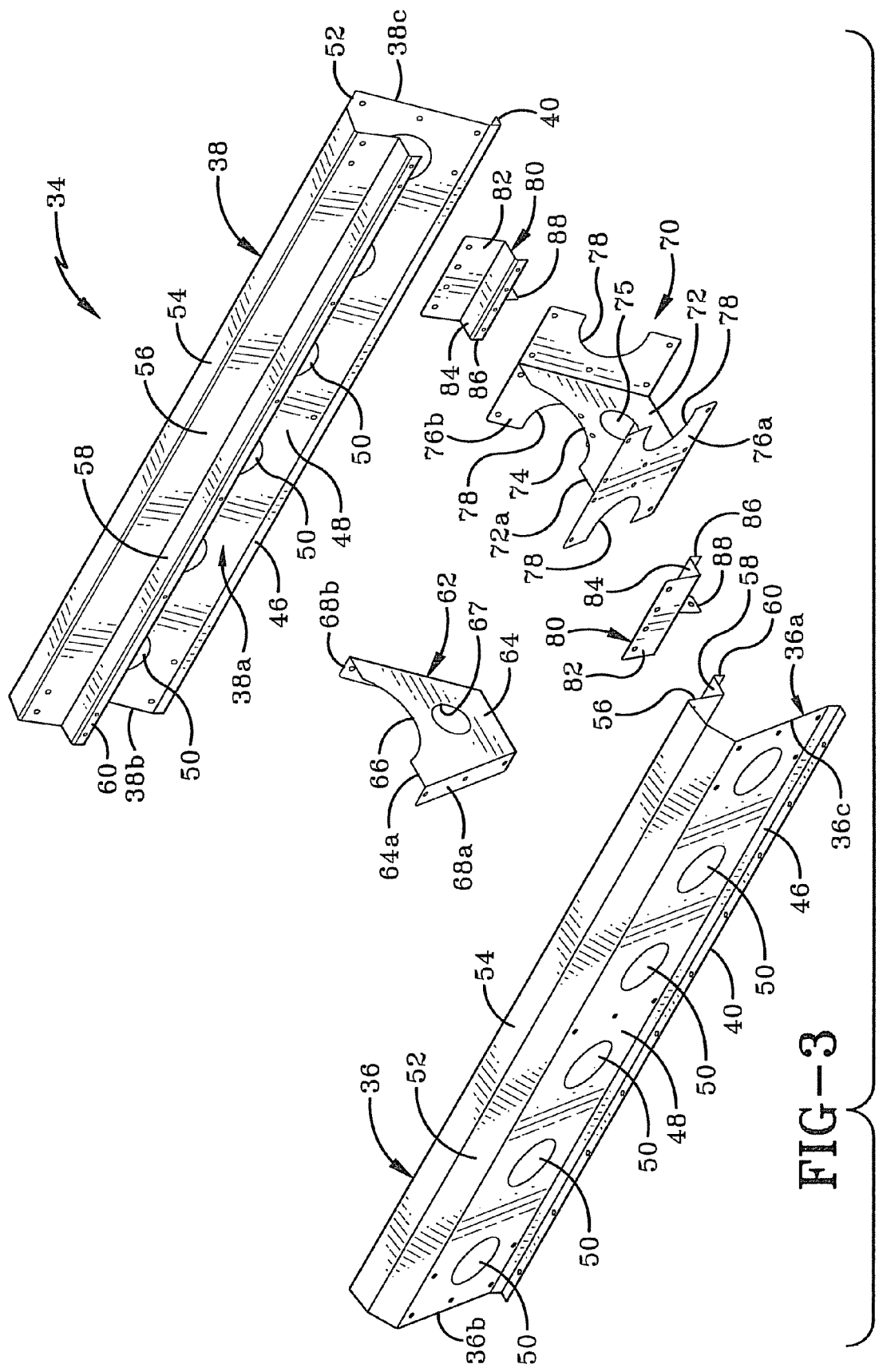
FIG. 3 is an exploded perspective view of the beam segment of FIG. 2.
Figure 7:
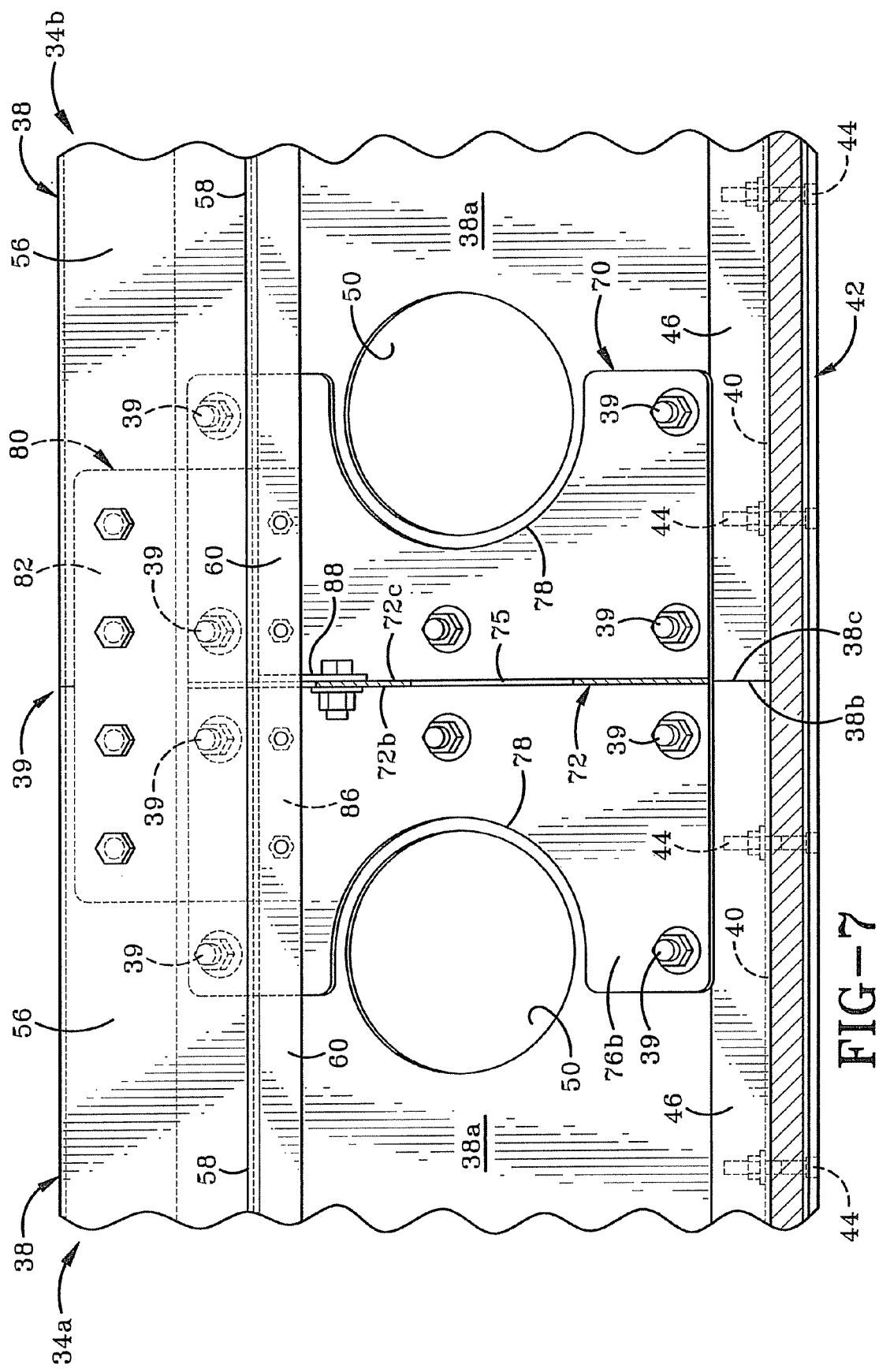
FIG. 7 is longitudinal section view of one side wall of the top beam taken through line 7-7 of FIG. 5 and showing a splice bracket connecting two beam segments together.
Figure 8:
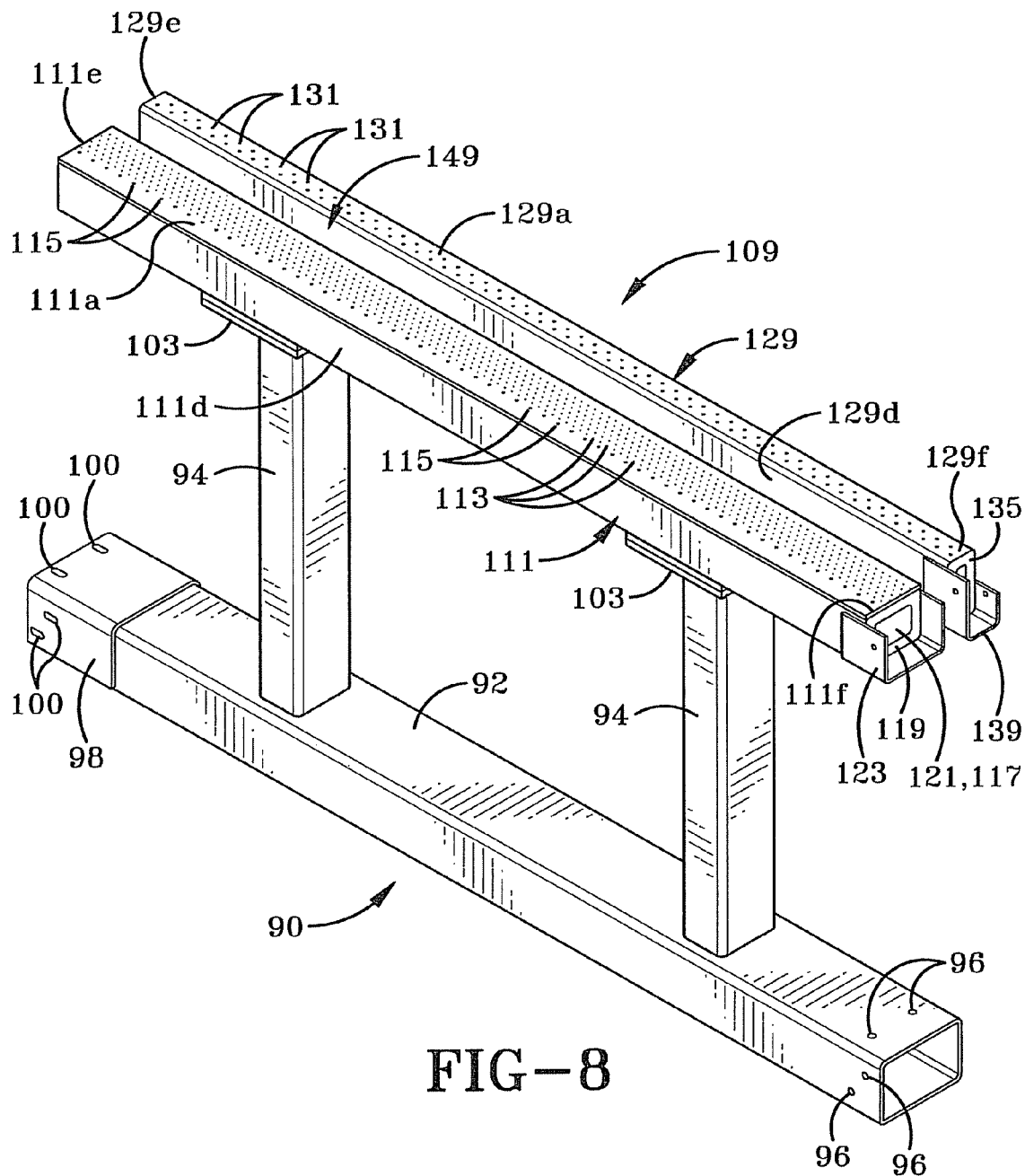
FIG. 8 is a perspective view of a single segment of the vacuum track and base assembly incorporated into the welding machine of FIG. 1.
Figure 9:
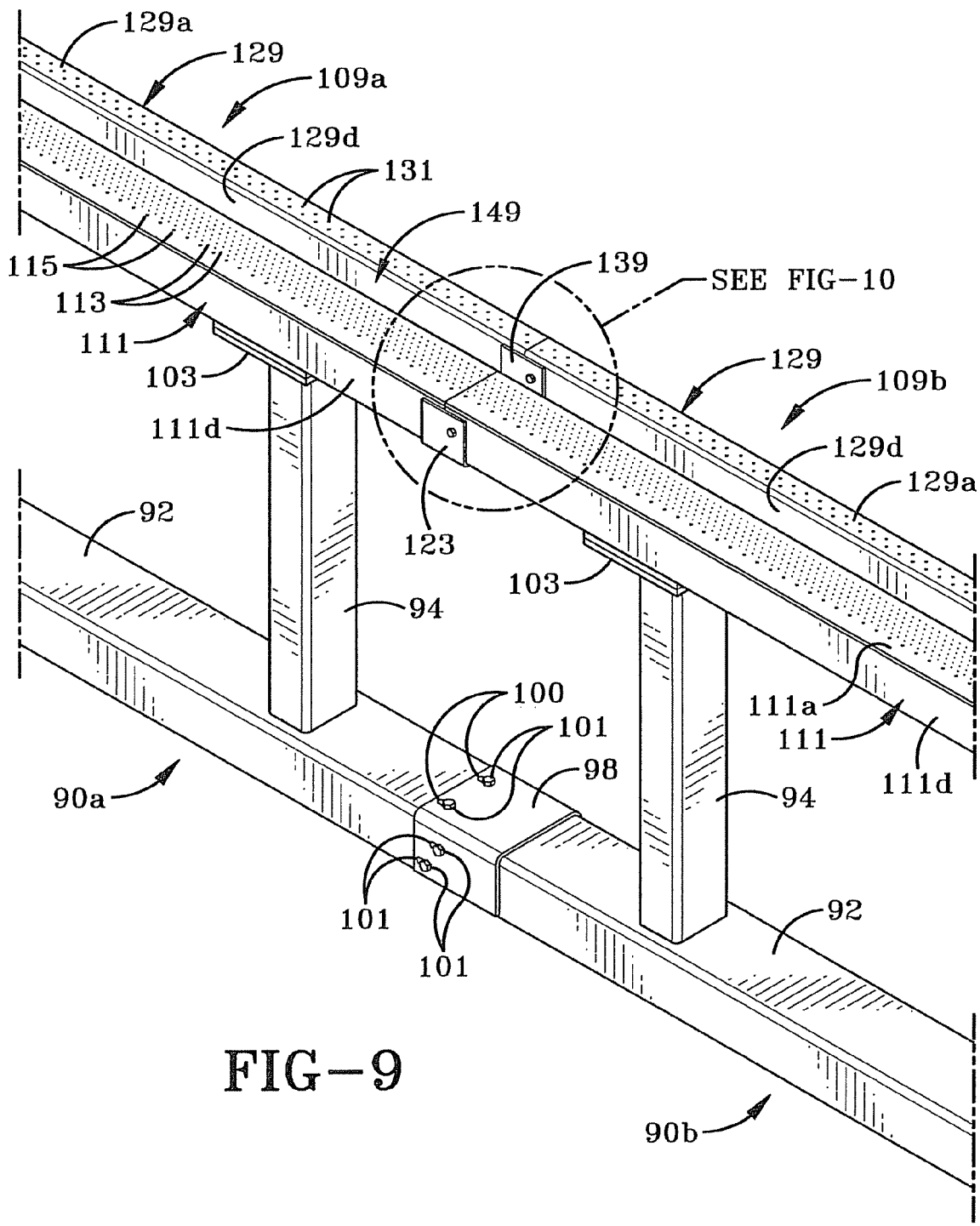
FIG. 9 is an enlarged perspective view of two adjacent segments of vacuum track and base assembly connected together.
Figure 10:
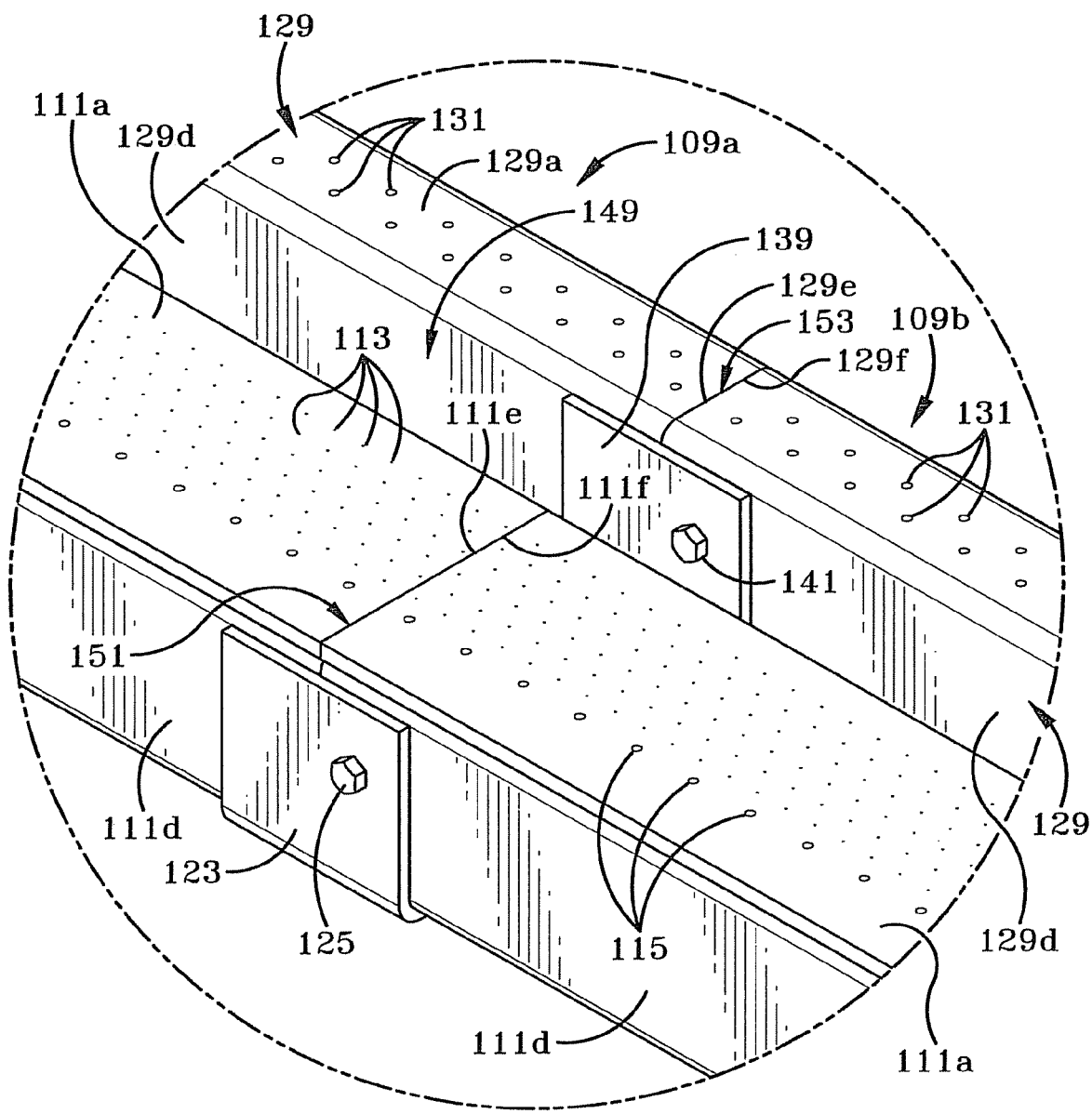
FIG. 10 is an enlarged perspective view of the highlighted area of FIG. 9.
Figure 11:
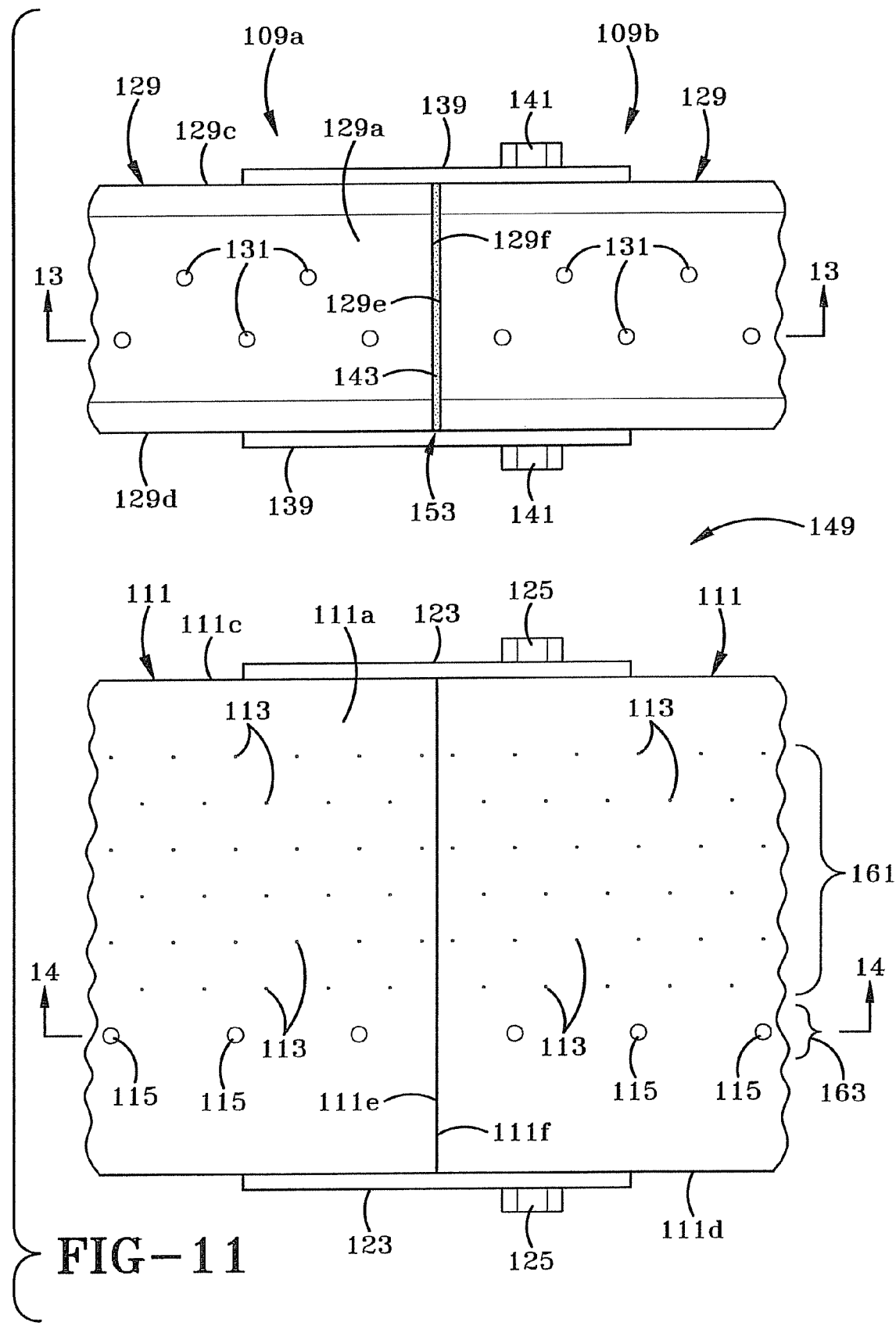
FIG. 11 is a top view of the connection region of two segments of the first and second vacuum tubes of the vacuum track.

Referring to FIGS. 3, 6 and 7, adjacent beam segments 34a, 34b are joined together using a splice bracket 70. While any suitably shaped splice bracket may be used for this purpose, in the preferred embodiment of the invention, splice bracket 70 includes a plate 72 which is substantially identically shaped to plate 64. Plate 72 therefore is generally a truncated V-shape and is configured to fit between the interior surfaces 36a, 38a of first and second side walls 36, 38. A top end 72a of plate 72 includes a semicircular depression 74 and an aperture 75 is defined centrally in plate 72. First and second flanges 76a, 76b extend outwardly from the side edges of plate 72. Flanges 76a, 76b are disposed so as to abut the interior surfaces 36a, 38b and preferably are secured thereto by bolts 39. Each flange 76a, 76b is generally rectangular in shape and defines a pair of semicircular depressions 78 in opposing side edges. Each depressions 78 is positioned and configured to align with a portion of one of apertures 50 in side walls 36, 38. Plate 72 is welded to each flange 76a, 76b along the flange's midline, with the midline being midway between the side edges that define depressions 78. Plate 72 extends between the interior surfaces of flanges 76a, 76b and preferably at right angles thereto. Splice bracket 70 is secured between side walls 36, 38 in such a manner that the midlines of flanges 76a, 76b are aligned with the edges 36c, 38c (FIG. 3) It will be understood that in a similar fashion a second splice bracket 70 will be used to secure end of beam segment 34 opposite edges 36c, 38c to an adjacent other beam segment. In that instance the midlines of flanges 76a, 76b will be aligned with edges 36b, 38b.

When splice bracket 70 is used to secure a first beam segment 34a (FIG. 7) to a second beam segment 34b, a first portion of each flange 76a abuts the interior surface 36a of side wall 36 of first beam segment 34a and a second portion of each flange 76a abuts interior surface 36a of side wall 36 of second beam segment 34b. It will be understood that similarly a first portion of each flange 76b abuts interior surface 38a of side wall 38 of first beam segment 34a and a second portion of each flange 76b abuts interior surface 38a of side wall 38 of second beam segment 34b. Bolts 39 secure flanges 76a, 76b to the respective side walls 36, 38.

Additionally, a pair of connector brackets 80 are provided to secure splice bracket 70 and first and second side walls 36, 38 together. Each connector bracket 80 is substantially stepped when viewed from the side and is designed to be engaged with one of side walls 36, 38. Connector bracket 80 comprises a first plate 82, a second plate 84, a third plate 86, and a tab 88. First plate 82 is complementary shaped to abut sixth wall section 56, second plate 84 is complementary shaped to abut seventh wall section 58, and third plate 86 is complementary shaped to abut eighth wall section 60. Consequently, the angular relationship between first, second and third plates 82, 84, 86 of connector bracket 80 is substantially identical to that of sixth, seventh and eighth wall sections 56, 58, 60. Each of first, second and third plates 82, 84, 86 are longitudinally oriented when secured to one of side walls 36, 38. First plate 82 and third plate 86 are bolted to the sixth wall section 56 and eighth wall section 60 respectively. Tab 88, on the other hand, extends laterally downwardly from third plate 86 and is bolted to plate 72 of splice bracket 70. When a first one of the connector plates 80 is secured to first side wall 36 and the second connector plate 80 is secured to second side wall 38, the tab 88 from the first connector plate 80 is secured to a first surface 72b (FIG. 7) of plate 72 and the tab 88 from the second connector plate 80 is secured to a second surface 72c of plate 72.

It should be noted that the end beam segments 34c which connect to end supports 14 differ somewhat from beam segments 34a & 34b. End beam segments 34c do not include as many apertures 50 in side walls 36, 38 as beam segments 34a, 34b and they are also provided with end caps at 51. Particularly, the region of end beam segments 34c adjacent end cap 51 does not include apertures 50 to provide a location to which a top end of end supports 14 may be secured. End beam segments 34c may also be shorter or longer than beam segments 34a, 34b. Beam segments 34c are connected to the associated adjacent beam segments 34a, 34b in the same manner as beam segment 34a is connected to beam segment 34b.

FIG. 6 illustrates diagrammatically how the seams between adjacent pairs of beam segments 34c, 34a, 34b and 34c are arranged relative to each other. As is evident from this figure, the seams between the first and second side walls 36, 38 in adjacent pairs of beam segments 34 are aligned with each other. For instance, the seam 37 between adjacent first side walls 36 and the seam 39 between adjacent second side walls 38 are aligned. This occurs because edge 36b of side wall 36 is aligned with edge 38b of side wall 38 and edge 36c of side wall 36 is aligned with edge 38c of side wall 38.

FIGS. 8-14 show the base assembly 20 and vacuum track assembly 18 in greater detail. Base assembly 20 comprises a plurality of base segments 90 connected together in end-to-end relationship. Vacuum track assembly 18 comprises a plurality of vacuum track segments 109 that are connected together in end-to-end relationship. Base segments 90 and vacuum track segments 109 are longitudinally aligned with top beam 16 and are disposed vertically thereunder.

Each base segment 90 includes a bottom support tube 92 and a plurality of spaced apart, vertical uprights 94 that extend outwardly away from an upper surface of bottom support tube 92. Bottom support tube 92 has a first end and a second end. A connector plate 98 is provided at the first end of tube 92 and a plurality of holes 96 are defined in the second end of tube 92. Connector plate 98 defines a plurality of slots 100 therein. Although not shown in these figures, it will be understood that connector plate 98 preferably is substantially U-shaped in cross-section and defines a U-shaped opening sized to receive a second end of an adjacent base segment 90. Connector plate 98 is utilized when connecting a first base segment 90a (FIG. 9) to an adjacent second base segment 90b. In order to accomplish this, the second end of first base segment 90a is inserted into connector bracket 98 of second base segment 90b. Holes 96 in the second end of first base segment 90a align with slots 100 in connector bracket 98 of second base segment 90b. Fasteners 101 are inserted through the aligned holes 96 and slots 100 to fixedly connect first and second base segments 90a, 90b together.

Connector tubes 105 (FIG. 1) are attached at either end of the plurality of joined base segments 90 to secure the base segments 90 to end supports 14 of frame assembly 11. Connector tubes 105 are provided with the necessary attachment mechanisms to connect to base segments 90 at one end at to end supports 14 at the other. Base segments 90 and connector tubes 105 may also be provided with leveling mechanisms 107 like those on end supports 14.

Each base segment 109 further includes a plurality of mounting plates 103 for attachment of vacuum tube assembly 18. Each mounting plate 103 is provided across a top end of one of the vertical uprights 94 and is disposed at right angles to upright 94. Still referring to FIGS. 8-14, each vacuum track segment 109 comprises a first vacuum tube 111 and a second vacuum tube 129. Each of the first and second vacuum tubes 111, 129 are elongate tubular members that are mounted laterally alongside each other on upper surfaces of mounting plates 103 of joined base segments 90. First and second vacuum tubes 111, 129 are longitudinally aligned with bottom support tube 92 and are laterally separated from each other by a gap 149, as will be hereinafter described.

First vacuum tube 111 has a top wall 111a, a bottom wall 111b, side wall 111c, 111d, a first end 111e and a second end 111f. Top wall 111a defines a first plurality of holes 113 and a second plurality of holes 115 therein. Holes 13 are smaller in diameter than holes 15. Larger holes 115 preferably are provided in a row that is adjacent and parallel to side wall 111d. Smaller holes 113 are provided in a plurality of rows that run parallel to side walls 111c, 111d and extend from adjacent the row of larger holes 115 to proximate side wall 111c. It will, of course, be understood that holes 113 and 115 do not have to be provided in rows but may, instead, be provided in other patterns that are substantially evenly distributed across top wall 129a. Additionally, more than one row of larger holes 115 may be provided adjacent the row illustrated in these figures. First vacuum tube 111 defines a longitudinal bore 117 therein that extends from first end 111e to second end 111f thereof. Holes 113, 115 provided access for air to flow from outside of first vacuum tube 111 into bore 117 when vacuum source 22 is activated as will be hereinafter described.

Each of the first and second ends 111e, 111f of first vacuum tube 111 include a vertically oriented plate 119 that extends across the opening to bore 117. Each plate 119 is recessed slightly inwardly from the associated end 111e, 111f and defines an aperture 121 therein that provides access to bore 117.

A first portion of a substantially U-shaped splice bracket 123 is welded to a region of one or all of side and bottom walls 111c, 111d, 111b proximate second end 111f of first vacuum tube 111. A second portion of splice bracket 123 extends longitudinally outwardly for a distance beyond second end 111f. Splice bracket 123 is used to connect adjacent pairs of first vacuum tubes 111 together when a first vacuum track segment 109a (FIG. 9) is connected in end-to-end relationship with a second vacuum track segment 109b. The second portion of splice bracket 123 extending outwardly from first vacuum track segment 109a is configured to receive the first end 111e of first vacuum tube 111 of second vacuum track segment 109b. The second portion of splice bracket 123 defines a pair of holes for receiving fasteners 125 therethrough to secure the first end 111e of second vacuum track segment 109b to first vacuum track segment 109a. A sealant 127 is applied to the outer surface of at least one of plates 119 prior to connecting the adjacent first vacuum tubes 111 together. This aids in securing the first vacuum tubes together and ensures that a vacuum will be maintained in the extended bore 117 formed by the adjacent tubes when vacuum source 22 is activated.

It should be noted that, because each plate 119 is recessed for a short distance into the bore 117 of one or both of the first vacuum tubes 111, when adjacent first vacuum tubes 111 are connected together, plates 119 and sealant 127 to not extend all the way to the exterior surface of top walls 111a. Thus, top walls 111a of adjacent vacuum tubes 111 are substantially continuous. This ensures that roller 24a on welding head 24 has a substantially unbroken surface over which to travel as it applies pressure to fabric retained on first vacuum tube 111. If this were not the case, every connection zone between adjacent first vacuum tubes would potentially cause a break in the quality of the weld in the fabric overlaying the zone.

Second vacuum tube 129 has a top wall 129a, a bottom wall 129b, side wall 129c, 129d, a first end 129e and a second end 129f. Top wall 129a is perforated in that it defines a plurality of holes 131 therein arranged in one or more rows that run substantially parallel to side walls 129c, 129d. It will be understood that holes 131 do not have to be provided in rows but may be provided in other patterns that are substantially evenly distributed across top wall 129a. Preferably, all of holes 131 are of the same diameter and that diameter may be smaller, larger or the same as either of holes 113 and 115. Second vacuum tube 129 defines a longitudinal bore 133 therein that extends from first end 129e to second end 129f thereof. Holes 131 provided access for air to flow from outside of second vacuum tube 129 into bore 133 when vacuum source 22 is activated.

Figure 13:
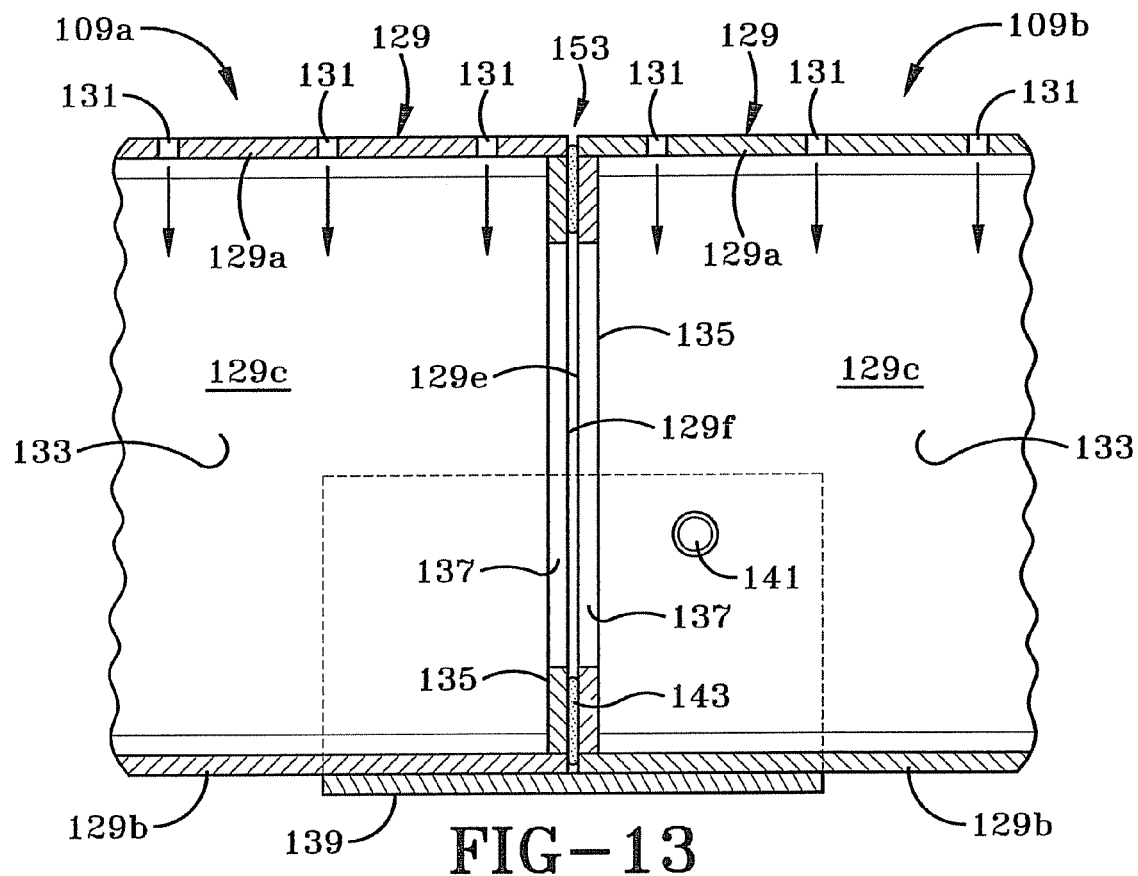
FIG. 13 is a cross-sectional side view of the first vacuum tube of the vacuum track taken through line 13-13 of FIG. 11.
Figure 14:
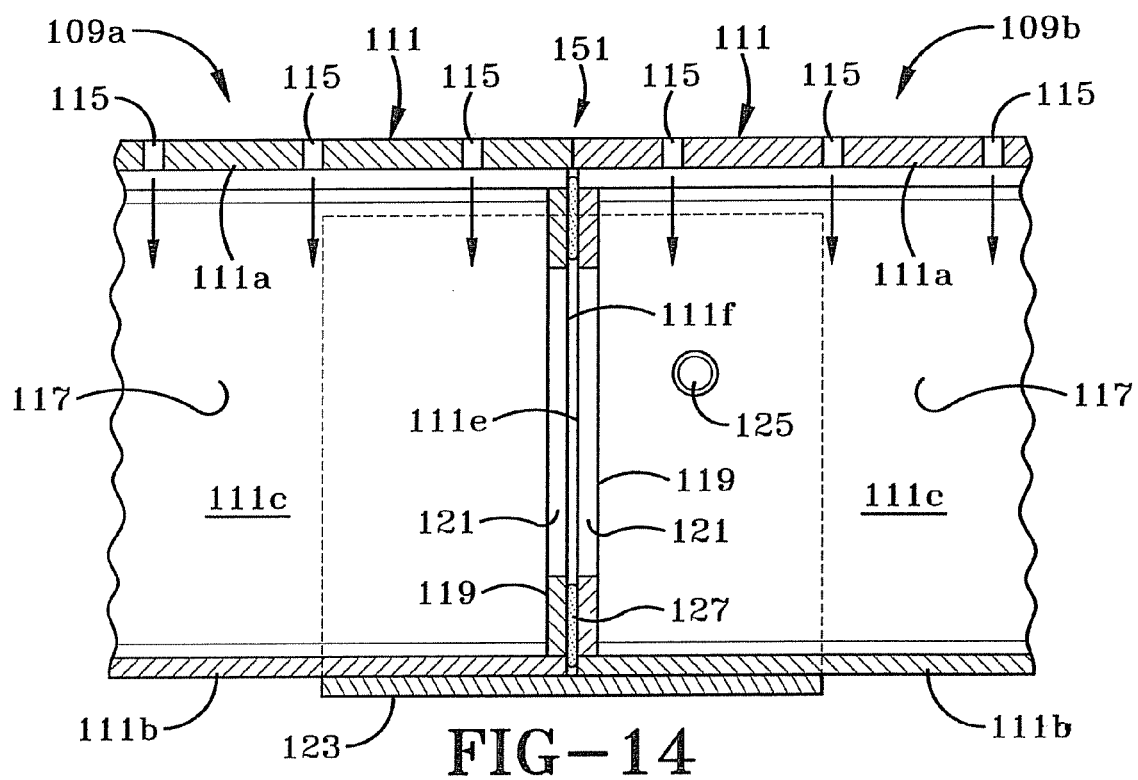
FIG. 14 is a cross-sectional side view of the second vacuum tube of the vacuum track taken through line 14-14 of FIG. 11.

As shown in FIG. 13, first and second ends 129e, 129f of second vacuum tube 129 each include a vertical plate 135 that extends across the opening to bore 133. Each plate 135 is substantially aligned with the edge of second vacuum tube 129 and defines an aperture 137 therein that provides access to bore 133. A first portion of a splice bracket 139 is welded to side and bottom walls 129c, 129d, 129b proximate second end 129f of second vacuum tube 129. A second portion of splice bracket 139 extends longitudinally outwardly for a distance beyond second end 129f. Splice bracket 139 is utilized to aid in connecting a second vacuum tube 129 of first vacuum track segment 109a (FIG. 9) to a second vacuum tube 129 of second vacuum track segment 109b. Splice bracket 139 preferably is substantially U-shaped and is configured to receive first end 129e of the second vacuum tube of second vacuum track segment 109b therein. Splice bracket 139 has two side legs which extend for different vertical distances along side walls 129c, 129d of vacuum tubes 129. This enables the manufacturer to correctly orient second vacuum tube 129 when assembling the vacuum track assembly. Splice bracket 139 defines holes therein for fasteners 141 to secure the second end 129e of the second vacuum tube 129 of vacuum track segment 109b to the first end 129f of the second vacuum tube 129 of first vacuum track segment 109a. A sealant 143 is applied to the outer surface of at least one of plates 135 prior to connecting adjacent second vacuum tubes 129 together. Sealant 143 aids in joining the adjacent second vacuum tubes together and ensures that a vacuum will be maintained in the extended bore 133 when vacuum source 22 is activated.

There is no need for creating a substantially continuous and unbroken top wall 129a when joining the adjacent second vacuum tubes 129. However, it will be understood that plates 135 may be recessed inwardly into the bores 133 of second vacuum tubes 129 in much the same way as plates 119 are recessed into the bores 117 of first vacuum tubes 111 so that a substantially continuous top wall 129a may be formed.

Figure 12:
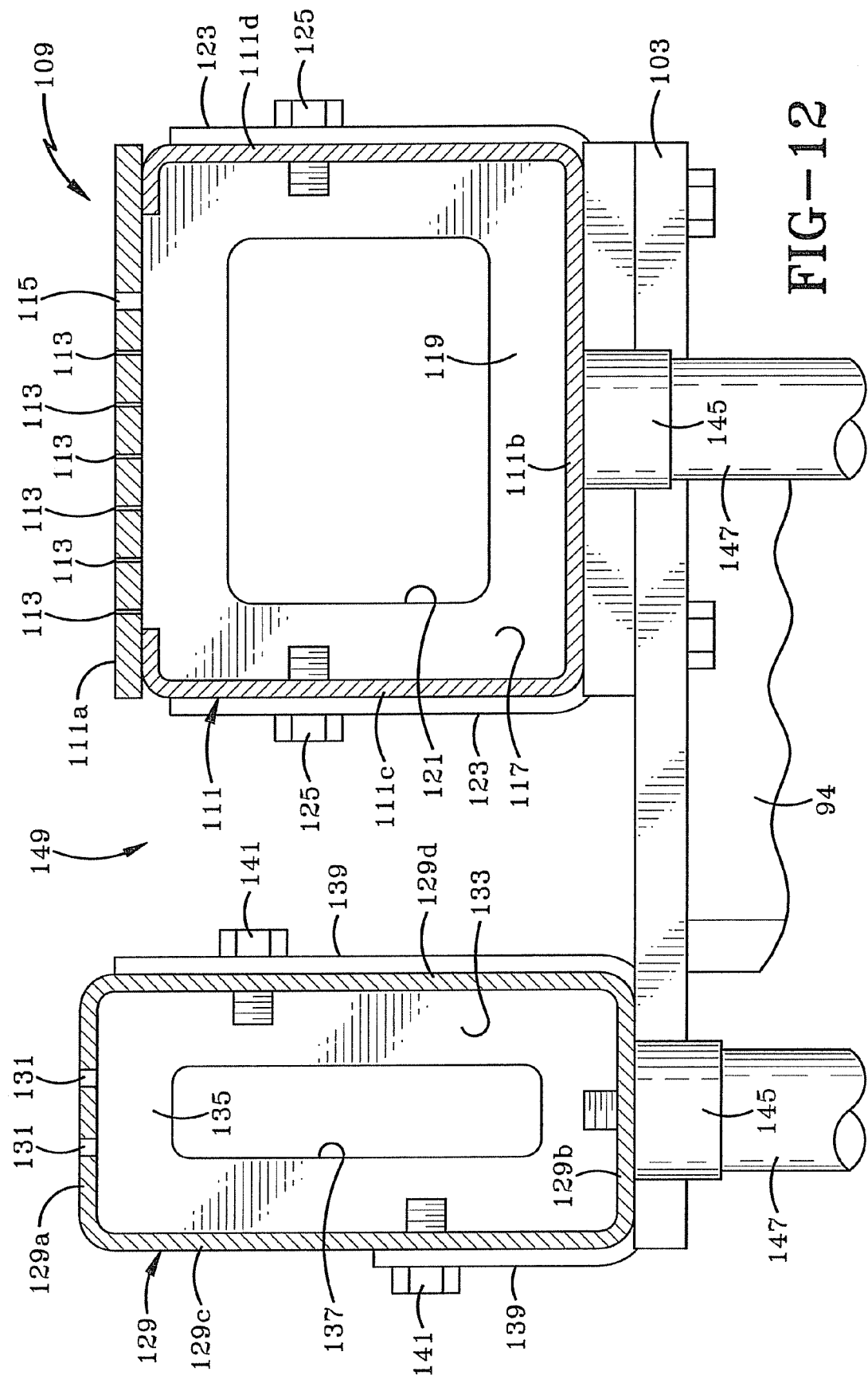
FIG. 12 is a cross-sectional side view of the vacuum track taken through line 12-12 of FIG. 1.

Referring to FIG. 12, an opening (not shown) is provided in the bottom walls 111b and 129b of each of first and second vacuum tubes 111, 129. A hose fitting 145 is welded to the bottom walls 111b, 129b surrounding this opening and a hose 147 connects each fitting 145 to remote vacuum source 22 (FIG. 1).

In accordance with a specific feature of the present invention, a longitudinally aligned gap 149 (FIG. 12) is provided between first and second vacuum tubes 111, 113 when they are secured to mounting plates 103. Gap 149 is of importance as it provides an escape route for hot air that is introduced into the vicinity of first and second vacuum tubes 111, 113 during a welding operation as will be hereinafter described.

Figure 15:
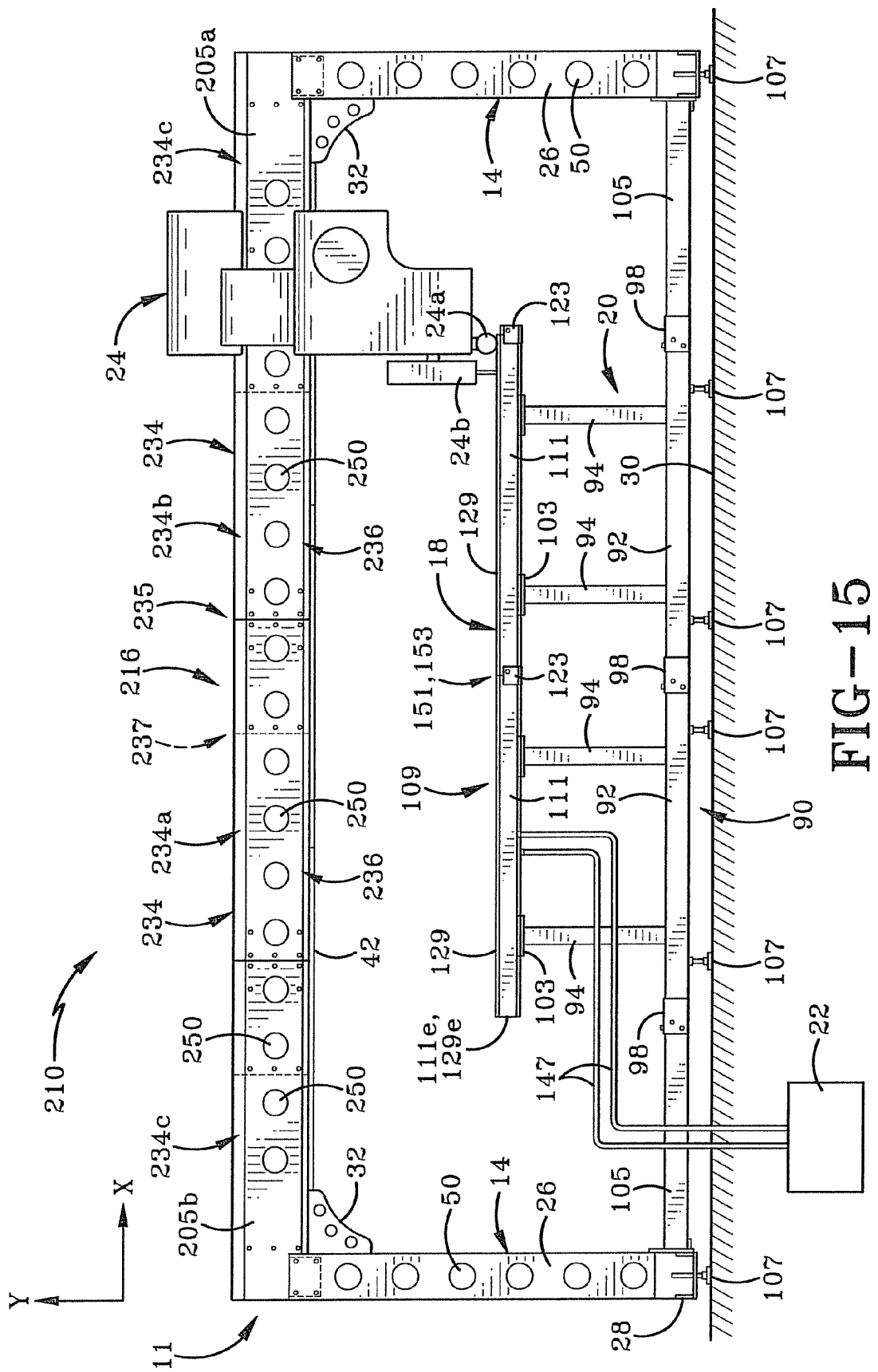
FIG. 15 is a side elevation of a welding machine in accordance with the present invention which incorporates a second embodiment of a beam segment in the top beam of the machine.

Referring to FIG. 15, there is shown a welding machine, generally indicated at 210, that incorporates a top beam 216 that is produced using a second embodiment of a beam segment 234. All other components of welding machine 210 are substantially identical to that of welding machine 10.

Beam segment 234 is shown in greater detail in FIGS. 16-19. Beam segment 234 comprises side walls 236 and 238 that are substantially identical in all respects to side walls 36 and 38 and therefore will not be discussed further. Beam segment 234 differs from beam segment 34 in that the side walls 36 and 38 are connected to each other in such a manner that the first edge 236b of side wall 236 is offset longitudinally relative to the first edge 238b of side wall 238. Obviously, this also leads to second edge 236c of side wall 236 being offset longitudinally relative to second edge 238c of side wall 238.

Because of this difference, the splice brackets 270 used to connect side walls 236, 238 together also differ from splice brackets 70. Splice bracket 270 includes a plate 272 that is generally a truncated V-shape and is configured to fit between the interior surfaces of the side walls 236, 238. A top end 272a of plate 272 includes a semicircular depression 274 and an aperture 275 is defined centrally in plate 272. First and second flanges 276a, 276b extend outwardly from the side edges of plate 272. Flanges 276a, 276b are disposed so as to abut the interior surfaces of side walls 36, 38 and are preferably secured thereto by bolts 239. Flange 276a is substantially identically shaped to flange 76a, is generally rectangular in shape and includes a pair of opposed semicircular depressions 278 positioned to align with portions of apertures 250 in the associated side walls 236, 238. Flange 276b, on the other hand, is configured to look like flange 68 of brace 62. Plate 272 is connected to flange 276a along the flange's midline and is connected to one of the side edges of flange 276b so that flange 276b only extends outwardly away from the connection with plate 272 in one direction. The plate 272 is disposed substantially at right angles to the surfaces of the flanges 276a, 276b. Splice bracket 270 is secured between side walls 236, 38 in such a manner that the midline of flange 276a is aligned with the second edge 236c of side wall 236.

A second splice bracket 270 is secured to side wall 238 in such a manner that the midline of the flange 276a is aligned with the first edge 238b of side wall 238. It should be noted that only one type of splice bracket 270 is required for making both of these connections. The installer will simply rotate splice bracket 270 through 180 degrees if he needs to align the midline of flange 276a with the edge of the opposite side wall.

Figure 19:
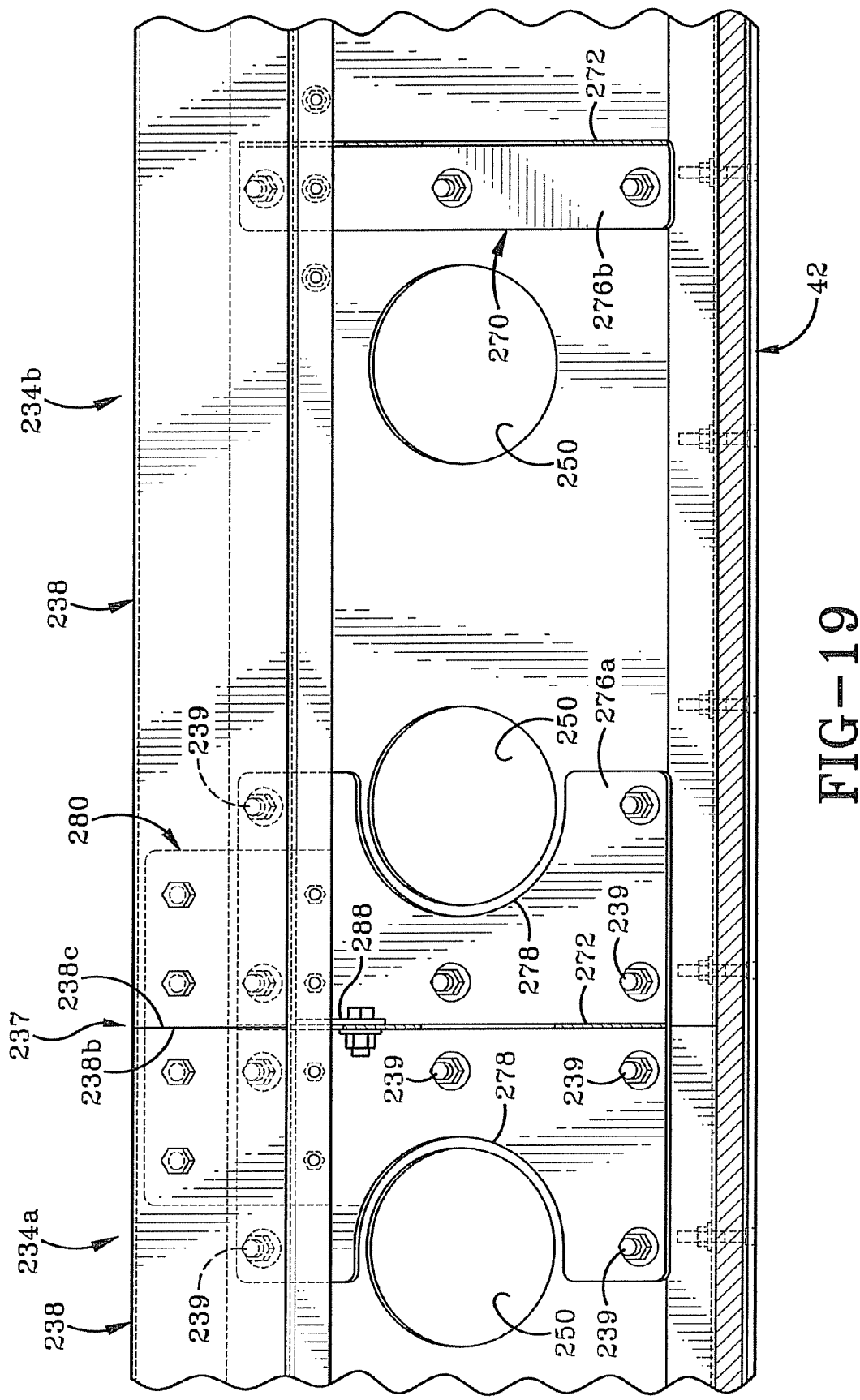
FIG. 19 is a longitudinal section view of one side wall of the top beam of FIG. 15 showing the connection between two beam segments.

Referring to FIGS. 15, 18 and 19, when beam segments 234 are to be utilized to make beam 216, a first offset piece 205a is secured to one end of the crossbeam 242. First offset piece 205a will then be connected to a side wall 238 of a first beam segment 234a. A second offset piece 205b is also secured to the end of crossbeam 242 laterally adjacent first offset piece 205a. Second offset piece 205b is connected to first side wall 236 of first beam segment 234a. The first and second offset pieces 205a, 205b differ in length. This, in turn, will offset the edge 236b of first side wall 236 relative to edge 238b of second side wall 238. FIG. 18 illustrates the situation where the first offset piece 205a is shorter than the second offset piece 205b. When all of the beam segments 234a, 234b, 234c are connected to each other and to the crossbeam 242, the seams 235 between the first side walls 236 are offset relative to the seams 237 between the second side walls 238. This staggered arrangement tends to top beam 216 being relatively stronger than beam 16.

Figure 16:
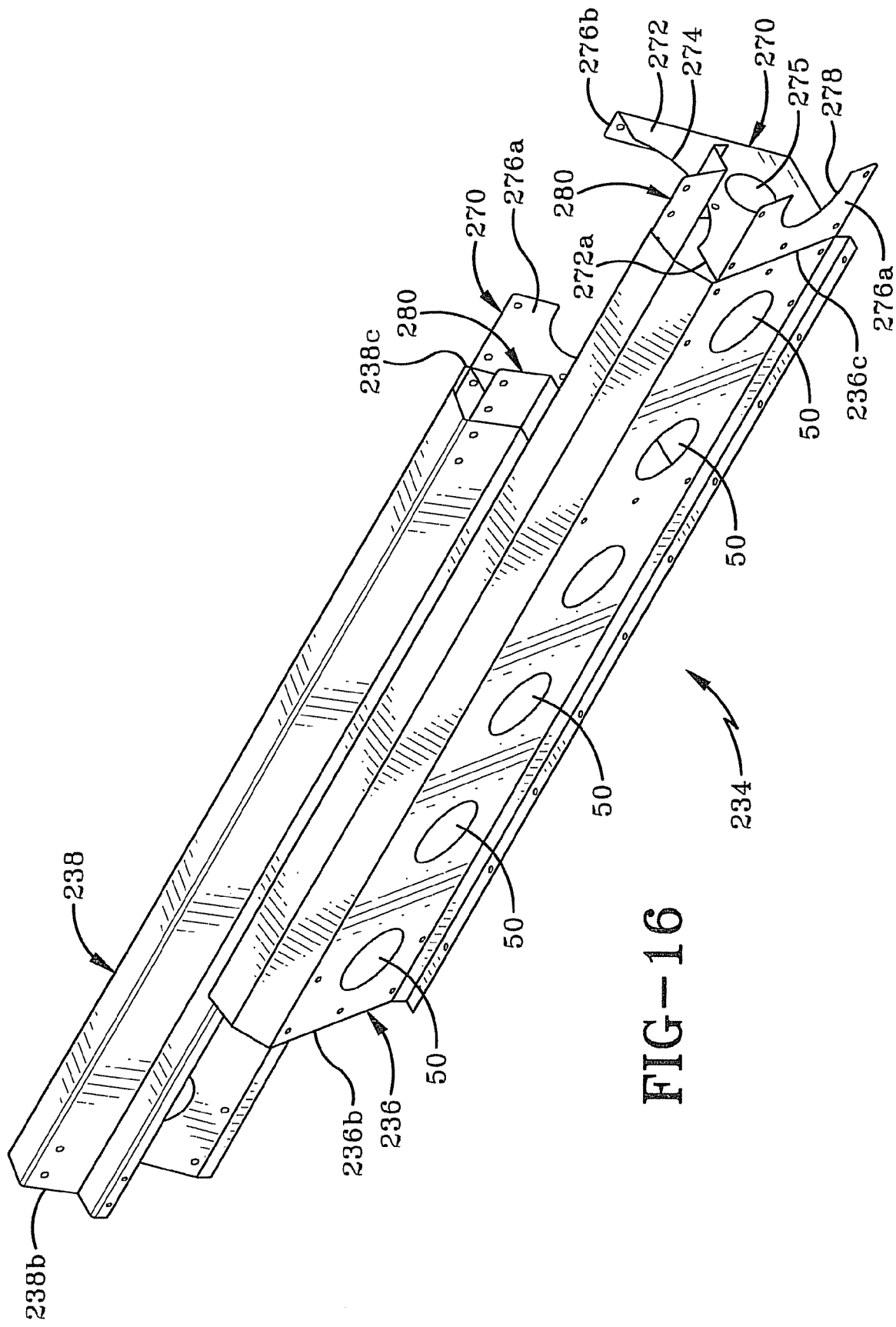
FIG. 16 is a perspective view of the second embodiment of a single beam segment utilized in the top beam.
Figure 17:
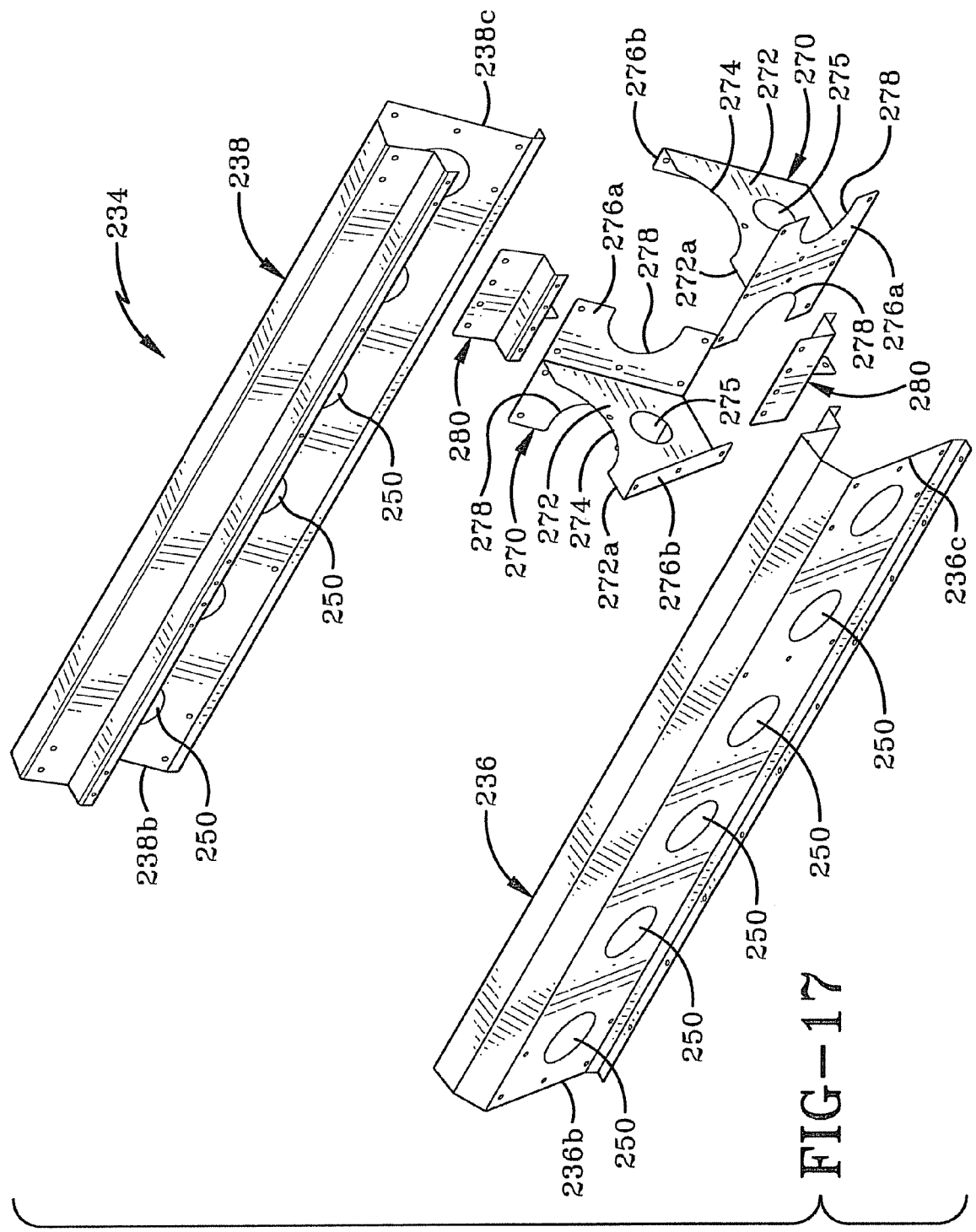
FIG. 17 is an exploded perspective view of the beam segment of FIG. 16.

Splice brackets 270 are used to secure side walls 236, 238 to each other and to side walls of adjacent beam segments 234. Referring to FIGS. 16, 17 & 19, if a first and second beam segment 234a and 234b are being secured together, a first splice bracket 270 will be aligned with second edge 238c of side wall 238 of first beam segment 234a and a second splice bracket 270 will be aligned with second edge 236c of side wall 236 of first beam segment 234a. These two splice brackets 270 will be oriented at 180 degrees relative to each other. The flange 276a of each splice bracket 270 is aligned with one of the second edges 236c, 238c so that a portion of the flange 276a extends longitudinally outwardly away from the second edges and into the interior of the adjacent side wall 236, 238 of second beam segment 234b. The flanges 276b will fall somewhere along the interior surface of the opposing side wall and between the first and second edges of that side wall. The flanges are secured to the side walls by appropriate means.

Brackets 280 are provided for connecting the sixth, seventh and eighth wall sections of the first and second side walls 236, 238 together in a similar fashion to bracket 80. However, a single bracket 280 is positioned adjacent each of the offset splice brackets 270. Consequently, each splice bracket 270 only has one tab 288 from one of the brackets 280 secured to the plate 272 thereof.

Figure 20:
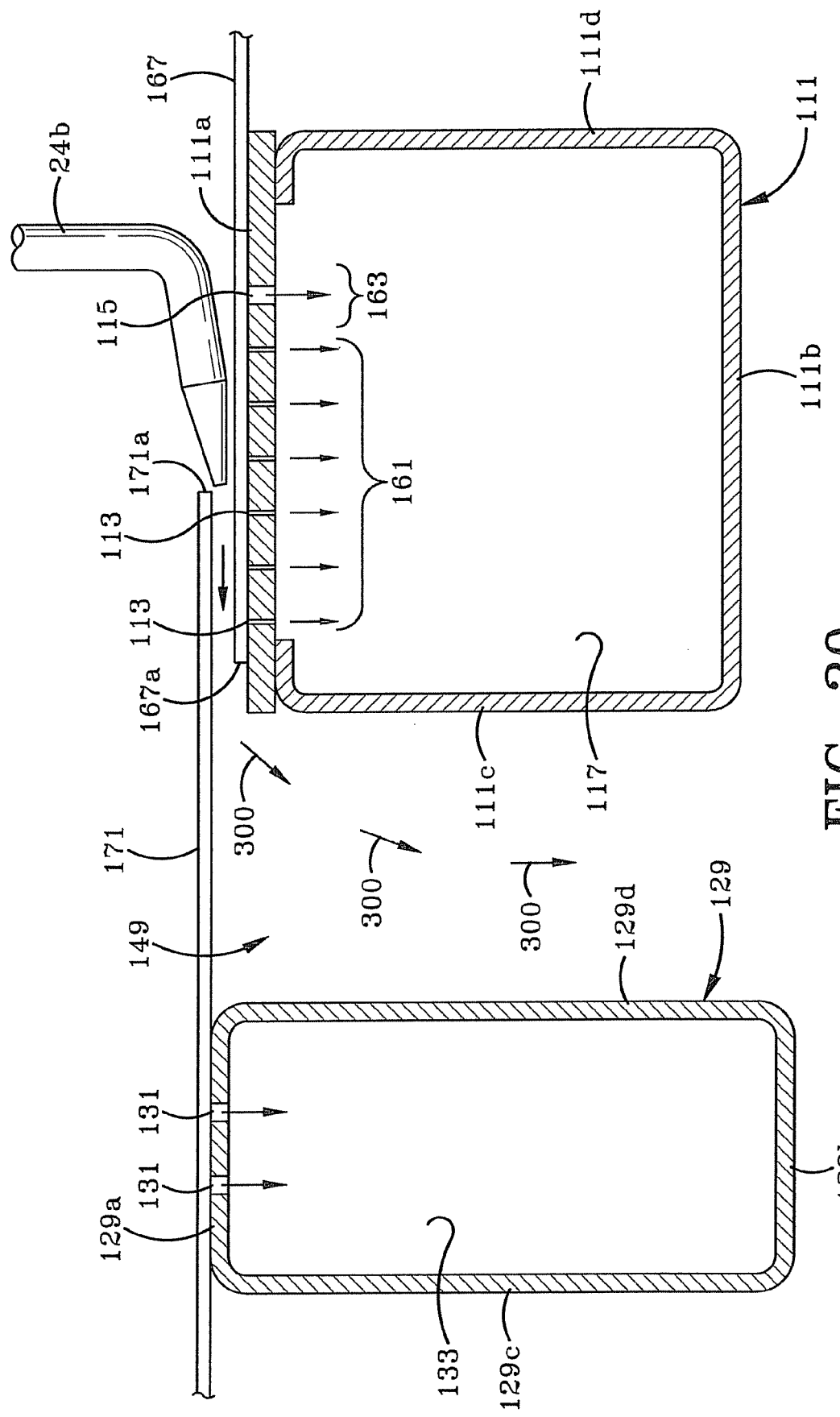
FIG. 20 is a cross-sectional side view of the vacuum track in operation showing two fabric layers retained thereon and showing the two layers being partially separated from each other by air flowing outwardly from an air nozzle on the welding head.
Figure 21:
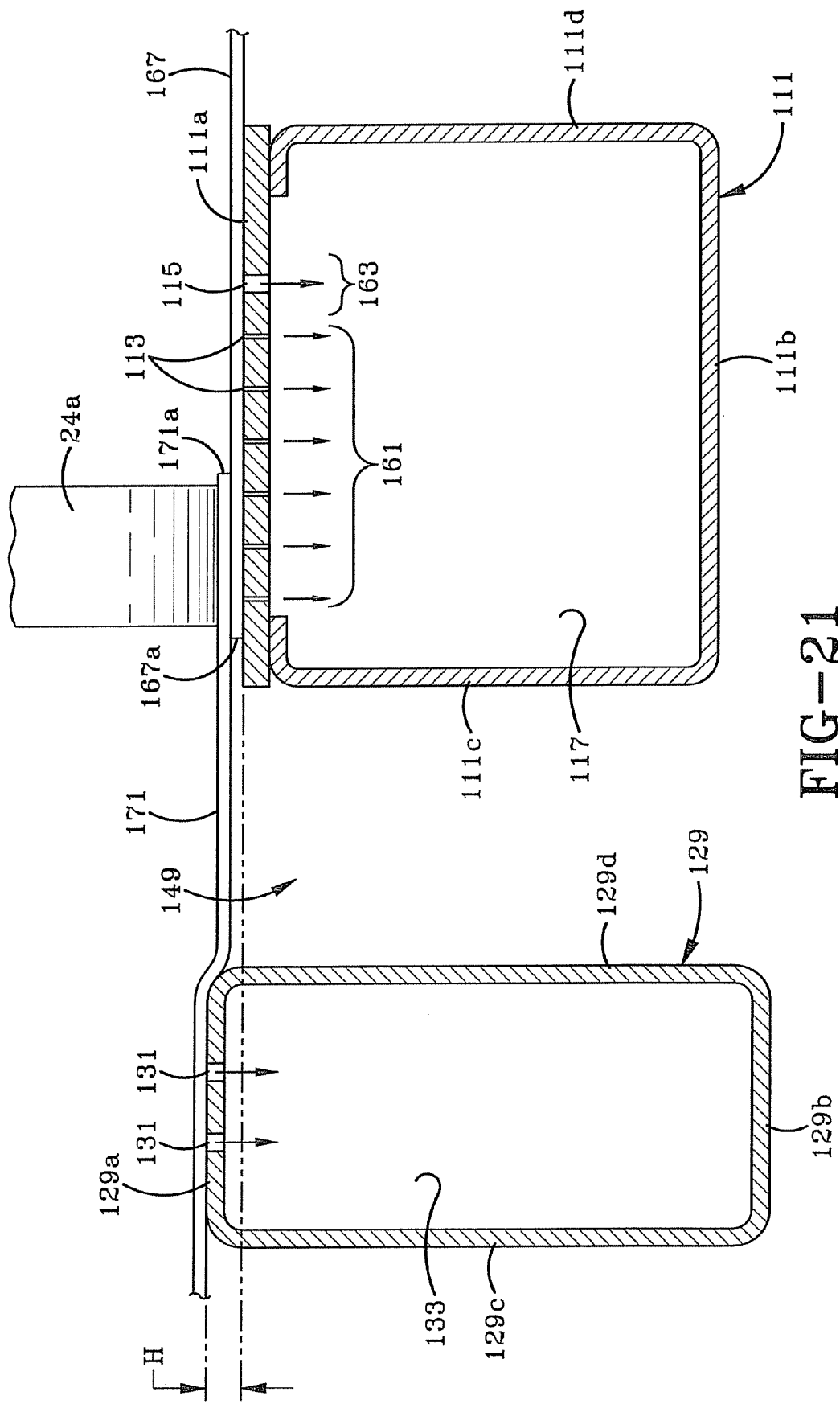
FIG. 21 is a cross-sectional end view showing the roller of the welding head engaging the fabric layers, where the upper surfaces of the first and second vacuum tubes are offset relative to each other.

FIGS. 1, 20 and 21 show the device of the present invention in operation. The operator activates vacuum source 22 which is connected to first and second vacuum tubes 111, 129 via hoses 147. Vacuum source 22 starts to evacuate the air from within the bores 117 and 133 of first and second vacuum tubes 111, 129, respectively. This sets up a flow of air from outside of first vacuum tube 111 into bore 117 thereof through both of smaller holes 113 and larger holes 115. The air flow is represented by the arrows in bore 117 of first vacuum tube 111. Because of the relative size difference in the diameters of holes 113, 115, the speed of air flowing into bore 117 through the small holes 113 is relatively higher than the speed of air flowing into bore 117 through the larger holes 115. This creates a greater suction in the region 161 of the exterior surface of top wall adjacent smaller holes 113 than in the region 163 of the exterior surface adjacent larger holes 115.

In a similar fashion, vacuum source 22 evacuates the air from within bore 133 of second vacuum tube 129 through the hose 147. This sets up a flow of air from outside tube 129 into bore 133. In this instance, however, all of the holes 131 in top wall 129a are of the same diameter and therefore the suction at the exterior surface of top wall 129a is relative constant laterally across the width of the top wall.

The operator now positions the two fabric panels that are to be welded on vacuum track assembly 18. These first and second fabric panels preferably will be fabrics that tend to melt at least partially upon application of heat thereto. Suitable fabrics for this type of application include polyvinylchloride, polyethylene and various other waterproof type fabrics. In order to position the fabrics for welding, the operator will first position an end region of a first fabric panel 167 on top wall 111a of first vacuum tube 111. This is done by pulling the end region of first fabric panel 167 across top wall 111a until the edge 167a thereof is proximate side wall 111c. Although not illustrated in these figures, welding machine 10 preferably includes a laser alignment device that projects a laser light beam along the top wall 111a of first vacuum tube 111. This beam can be used by the operator to correctly align the edge 167a of first fabric panel 167.

The airflow through both of smaller holes 113 and larger holes 115 pulls first fabric panel 167 into tight abutting contact with the exterior surface of top wall 111a. Because of the increased suction through smaller holes 113, the region of first fabric panel 167 disposed over holes 113 is more tightly retained against top wall 111a than the region disposed over larger holes 115. Holes 113 are provided in that region of top wall 111a over which a roller 24a of welding head 24 will pass. This region will be hereinafter referred to as the welding zone. The roller 24a does not pass over the region of top wall 111a where larger holes 115 are located. The reason for this will be explained later herein.

Once first fabric panel 167 is positioned correctly, the operator positions a second fabric panel 171 correctly for welding the same to first fabric panel 167. FIG. 20 illustrates the formation of an overlap seam between the first and second fabric panels 167, 171. Obviously, if a different type of seam or reinforcement is being welded between the first and second fabric panels 167, 171, the positioning of the panels will differ. However, in the instance illustrated, the operator will pull second fabric panel 171 across second vacuum tube 129, across gap 149 and onto the region of first vacuum tube 111 that defines smaller holes 113. Depending on the size of the seam to be created between the first and second fabric panels 167, 171 the location of the edge 171a of second fabric panel 171 will differ. Once again, a laser alignment device may be utilized to correctly align the edge 171a of the second fabric panel 171. The suction created by smaller holes 113 is sufficient to pull second fabric panel 171 downwardly toward first fabric panel 167. The larger holes 115 in first vacuum tube 111 aid in retaining a region of first fabric panel that is not being welded in place so that the portion of the first fabric panel 167 in the welding zone does not shift. Similarly, the suction on second fabric panel 171 passing over second vacuum tube 129 retains a region of second fabric panel that is not being welded in position so that the portion that is located in the welding zone does not shift.

Welding head 24 mounted on top beam 16 (or 216) includes a nozzle 24b that blows a quantity of extremely hot air between the overlapped portion of first and second fabric panels 167, 171. The hot air is designed to at least partially melt those portions of the first and second fabric panels 167, 171 that overlap each other and are located in the welding zone. Welding head 24 travels longitudinally along beam 16 from adjacent side 10d of machine 10 toward side 10c of the machine. The truncated V-shape of top beam 16 aids in keeping welding head 24 centered over the welding zone on first vacuum tube 111. (As mentioned previously, the welding zone is that portion of top wall 111a of first vacuum tube 111 that includes smaller holes 113.) This ensures that the seam formed by the welding head 24 remains consistently positioned relative to the edges 167a, 171a of the first and second fabric panels along the entire length of the seam.

The roller 24a (FIG. 21) follows immediately behind the nozzle 24b and is designed to apply pressure to the overlapped portion of the first and second fabric panels 167, 171 in the welding zone. The pressure applied to the partially melted regions of the first and second fabric panels 167, 171, causes the overlapped portion thereof to bond together to create a seam. The vacuum source 22 continues to evacuate air from the bores 117, 133 throughout this entire procedure. Consequently, the suction through holes 113, 115 and 131 remains substantially constant. This ensures that there is no shift in either of the first and section fabric panels during welding.

In accordance with a specific feature of the present invention, the hot air that has been introduced between the first and second fabric panels 167, 171 moves into gap 149 between the first and second vacuum tubes 111, 129, as indicated by the arrows 300, and dissipates into the surrounding air. This ensures that there is no heat build up in the welding zone that might adversely affect either of the first and second fabric panels 167, 171 and therefore affect the quality of the seam being produced. If the hot air were not provided with an escape route, it could potentially cause two problems. Firstly, it might interfere with the vacuum conditions that are created by first and second vacuum tubes 111, 113 by partially or fully lifting one or both fabric panels 167, 171 away from top walls 111a, 129a and thereby break suction. This could lead to shifting of the fabric and thereby lead to the production of less uniform seams. Secondly, the hot air could cause certain regions of the fabric panels 167, 171 to become overheated relative to the regions surrounding the same. This, again, could affect weld quality by causing some fabric material to melt to a greater degree than the adjacent material and thus affect bonding.

As mentioned previously, the welding zone does not include the row of larger holes 115 in top wall 111a. The reason for this is that if larger holes were provided in the welding zone, the fabric of first and second fabric panels might be sucked into the same. This could lead to separation between small areas of the first and second fabric panels. Consequently, when roller 24b passes over the welding zone these small areas would not be adequately pressured and could tend to not bond properly to each other. This would lead to a weakness in the seam which might cause the first and second fabric layers to be fairly easily separated from each other at a later time. Even if the first and second fabric panels did bond together in these small areas, the seam created might have a dimpled appearance which would be aesthetically unattractive.

Once the welding head 24 has traveled the entire length of vacuum track assembly 18, the operator will shut off vacuum source 22. This will break the suction on the first and second fabric panels 167, 171 positioned on first and second vacuum tubes 111, 129 and the joined panels can then be removed from machine 10.

It should be noted that FIGS. 20 and 21 illustrate a relationship between first and second vacuum tubes 111, 129 where top wall 129a of second vacuum tube 129 is disposed vertically higher than top wall 111a of first vacuum tube 111. This height differential is indicated by "H" in FIG. 21 and is created in order to accommodate the thickness of the seam that is being created in the welding zone.

Figure 22:
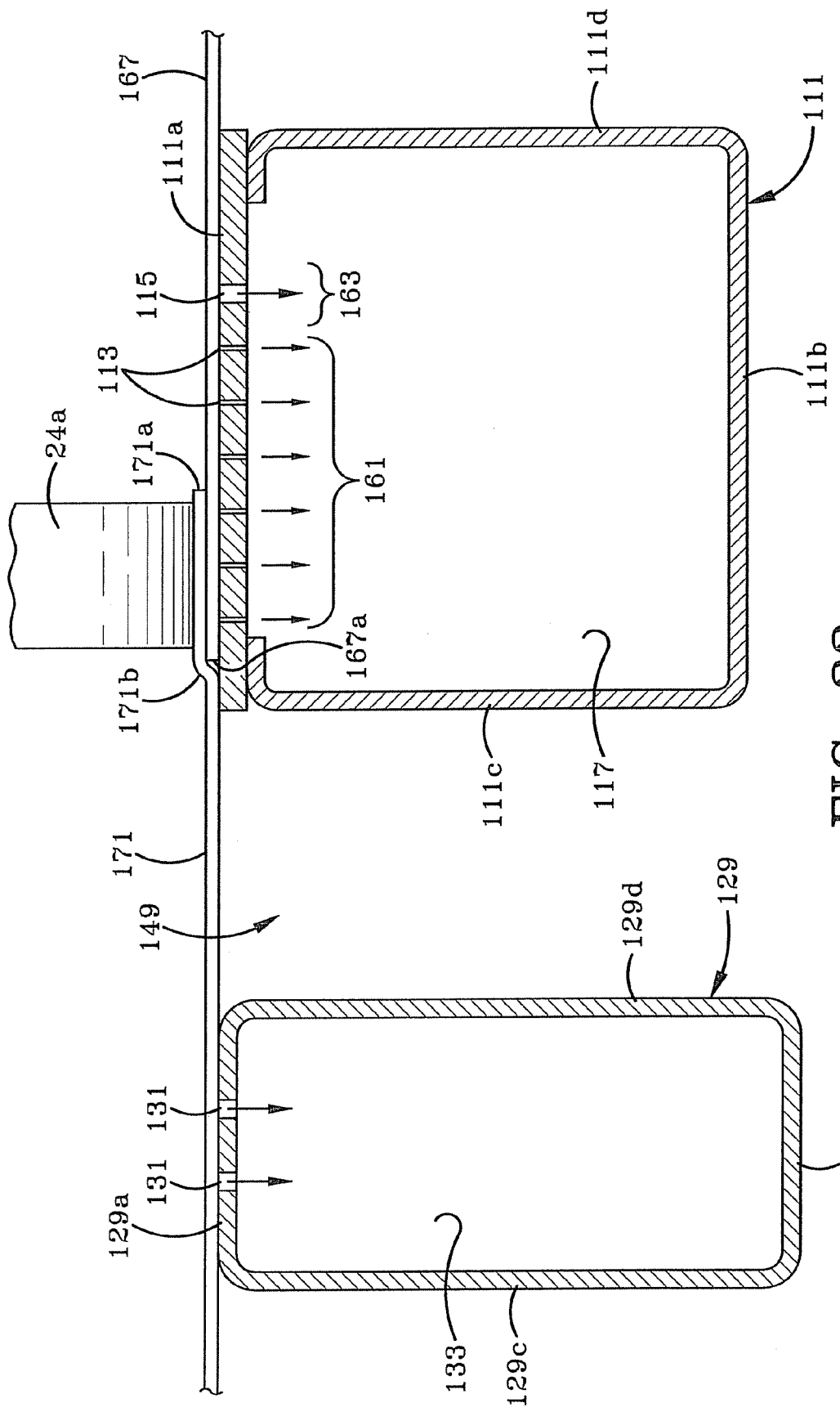
FIG. 22 is a cross-sectional end view showing the roller of the welding head engaging the fabric layers, where the upper surfaces of the first and second vacuum tubes are substantially coplanar.

FIG. 22 illustrates a variation in vacuum track assembly 18 in which top wall 129a of second vacuum tube 129 is substantially at the same height as top wall 111a of first vacuum tube 111. In this instance, second fabric panel 171 does not lay flat upon first fabric panel 167 in the welding zone but instead has a small region 171b where a change in fabric height occurs. In both versions of vacuum track assembly 18, a high quality, strong and flat seam is produced by welding machine 10.

Figure 23:
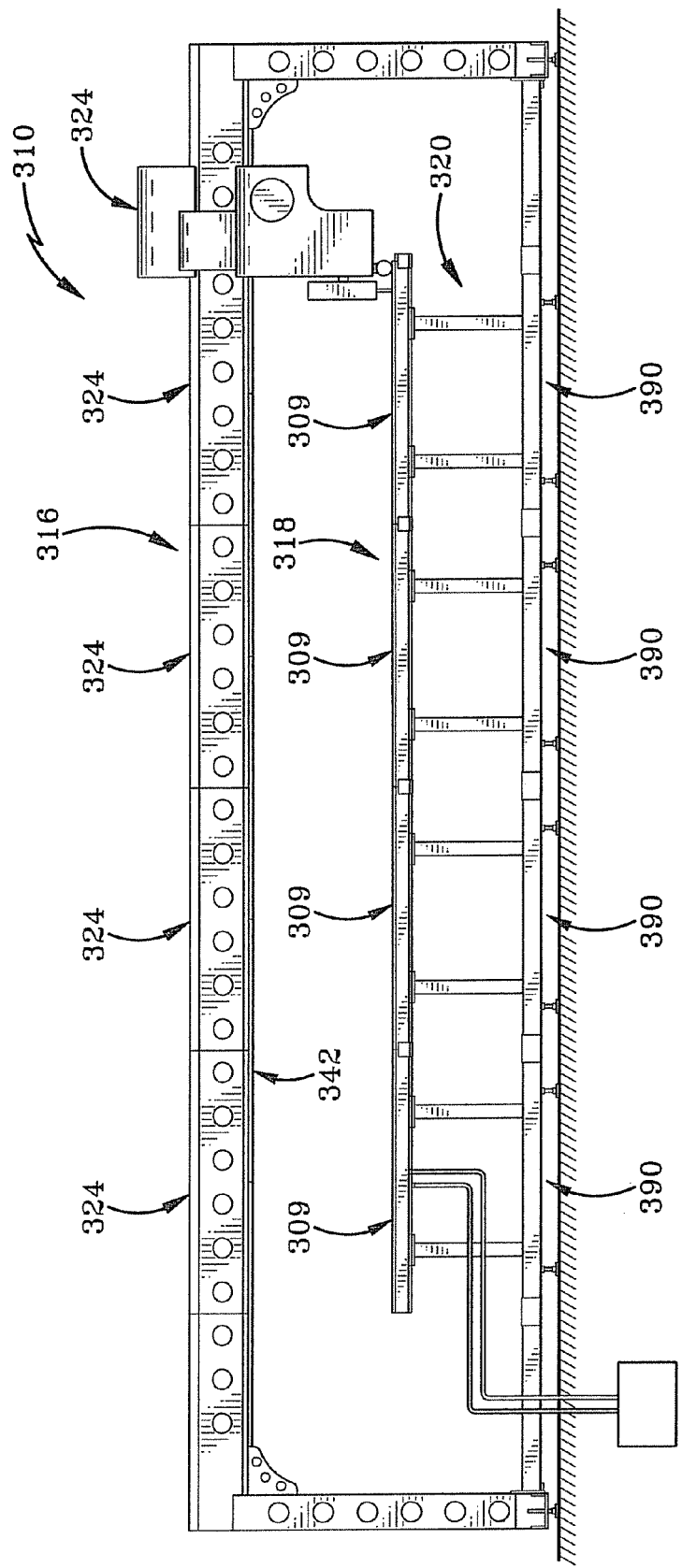
FIG. 23 is a front elevation of a welding machine in accordance with the present invention in which additional beam segments and vacuum tube and base assembly segments have been added into the machine to extend the overall operating length thereof.

FIG. 23 illustrates a welding machine 310 in accordance with the present invention and in which additional beam segments 324, vacuum segments 309, and base segments 390 have been added. The addition of these plurality of segments 324, 309 and 390 enable longer pieces of fabrics to be welded together because of the increase in length of the welding zone provided along the longitudinally aligned first vacuum track. The longer top beam 316 provides the necessary length of crossbeam 342 for welding head 324 to travel along. Essentially, the overall length of the welding zone can be custom built for any manufacturer so that they are able to create the desired length of seam in the products they are manufacturing. Additionally, it will be understood that each of the beam segments 324, vacuum segments 309 and base segments 390 may individually be made to any prescribed length so as to minimize the number of connections that have to be made to build the top beam 316, base assembly 320 and vacuum track assembly 318. Furthermore, in any particular manufacturing facility a longer crossbeam can be provided and the number of beam segments, base segments and vacuum track segments utilized can be varied as necessary so that the welding machine may be increased in length or shortened when required. This feature gives the manufacturer an expandable welding machine.

It will be understood that instead of the top wall of each of the first and second vacuum tubes being perforated with holes, one of the other longitudinally aligned walls of the vacuum tubes may be perforated and the first and second fabric panels positioned over that other perforated wall so that the vacuum within the tubes will retain the fabrics against the same. Additionally, the welding zone may still be located along the top wall of the first vacuum tube even if that wall is not the perforated wall that holds the fabric being welded in place. Still further, the welding head may include a pressure application mechanism, such as a roller that is oriented so as to apply pressure to a welding zone that is not on the top wall of the first vacuum tube but is instead on one of the other walls of that tube, even if the top wall is the perforated wall or if the wall along with the roller moves is the perforated wall. Similarly, if the welding zone is on one of the other walls of the first vacuum tube, the heat application mechanism will also be oriented so as to applying heat to the appropriate welding zone that will be acted on by the pressure application mechanism.

It will further be understood that the pressure application mechanism may be a roller, as disclosed herein, or may be any other means of applying pressure to the welding zone on the first vacuum tube. Additionally, it should be understood that the heat application mechanism may be an air nozzle, as disclosed herein, or may be any other means of applying heat to the welding zone.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A method of welding a first fabric panel and a second fabric panel together comprising the steps of:
    activating a vacuum source to evacuate air from a first vacuum tube and from a second vacuum tube of a welding machine;
    generating a vacuum in each of the first and second vacuum tubes;
    immobilizing a first region of the first fabric panel and a second region of the second fabric panel on the first vacuum tube and beneath a welding head of the welding machine using the vacuum in the first vacuum tube;
    drawing a third region of the second fabric panel into abutting contact with a perforated surface on the second vacuum tube using the vacuum in the second vacuum tube; and
    welding the first region and the second region together.

2. The method of welding as defined in claim 1, wherein the step of welding the first and second regions together further comprising the step of:
    applying heat to the first and second regions of the first and second fabric panels.

3. The method of welding as defined in claim 2, wherein the step of welding the first and second regions together further comprises the steps of:
    applying pressure to the heated first and second regions of the first and second fabric panels.

4. The method of welding as defined in claim 3, wherein the step of: applying heat and pressure to the first and second fabric panels is accomplished by:
    setting a level of pressure to be applied by a roller on the welding head;
    activating the welding head to travel along a track assembly disposed above the first vacuum tube;
    blowing a stream of heated air out of a nozzle on the welding head and between the first and second regions of the first and second fabric panels;
    rolling the roller over the heated, first and second regions of the first and second fabric panels at the preset level of pressure.

5. The method of welding as defined in claim 1, wherein the step of immobilizing the first and second fabric panels includes the steps of:
    positioning a first region of the first fabric panel adjacent a perforated wall of the first vacuum tube;
    drawing the first into contact with the perforated wall with the vacuum in the first vacuum tube;
    positioning a second region of the second fabric panel adjacent the first region of the first fabric panel; and
    drawing the second region into abutting contact with the first region with the vacuum.

6. The method of welding as defined in claim 5, wherein the step of positioning a first region of the first fabric panel adjacent a perforated wall of the first vacuum tube comprises:
    positioning the first region of the first fabric panel over a first portion of the wall that includes a plurality of first smaller holes and over a second portion of the wall that includes a plurality of second larger holes.

7. The method of welding as defined in claim 6, wherein the steps of positioning the first and second regions of the first and second fabric panels includes the step of:
    overlapping the first region of the first fabric panel with the second region of the second fabric panel.

8. The method of welding as defined in claim 7, further comprising the steps of:
    applying heat to the overlapped first and second regions of the first and second fabric panels; and
    applying pressure to the overlapped first and second regions of the first and second fabric panels.

9. The method of welding as defined in claim 8, wherein the step of applying heat comprises the step of:
    blowing hot air between the first and second regions of the first and second fabric panels.

10. The method of welding as defined in claim 9, further comprising the steps of:
    melting, at least partially, the overlapped first and second regions; and
    applying pressure immediately to the heated overlapped first and second regions.

11. The method of welding as defined in claim 10, wherein the steps of applying heat and applying pressure comprises:
    applying heat and pressure only to areas of the overlapped first and second regions of the first and second fabric panels which are disposed over the plurality of first smaller holes of the first portion of the first vacuum tube.

12. The method of welding as defined in claim 8, wherein the step of applying heat comprises the step of:
    heating the perforated wall of the first vacuum tube to at least partially melt the first region of the first fabric panel; and
    applying pressure to the overlapped first and second regions of the first and second fabric panels which are disposed over the plurality of first smaller holes of the first portion of the first vacuum tube.

13. The method of welding as defined in claim 8, further comprising the steps of:
    moving the welding head along a guiding track disposed vertically above and aligned with the first vacuum track.

14. The method of welding as defined in claim 13, further comprising the steps of:
    positioning a nozzle on the welding head proximate the overlapped first and second regions of the first and second fabric panels; and
    blowing heated air through the nozzle and between the overlapped first and second regions as the welding head moves along the guiding track.

15. The method of welding as defined in claim 14, further comprising the steps of:
    positioning a roller on the welding head directly over the first portion of the first vacuum tube that includes only the first smaller holes.

16. The method of welding as defined in claim 15, further comprising the steps of:
    lowering the roller into abutting contact with the second region of the overlapped first and second regions of the first and second fabric panels; and
    applying pressure to the overlapped first and second regions with the roller immediately after blowing heated air therebetween.

17. A method of welding a first fabric panel and a second fabric panel together comprising the steps of:
    activating a vacuum source to evacuate air from a first vacuum tube of a welding machine;
    generating a vacuum in the first vacuum tube;

immobilizing a first region of the first fabric panel and a second region of the second fabric panel on the first vacuum tube and beneath a welding head of the welding machine using the vacuum;

positioning a first region of the first fabric panel adjacent a perforated wall of the first vacuum tube such that the first region of the first fabric panel is disposed over a first portion of the wall that includes a plurality of first smaller holes and over a second portion of the wall that includes a plurality of second larger holes;

drawing the first into contact with the perforated wall with the vacuum in the first vacuum tube;

positioning a second region of the second fabric panel adjacent the first region of the first fabric panel;

overlapping the first region of the first fabric panel with the second region of the second fabric panel; and drawing the second region into abutting contact with the first region with the vacuum;

activating the vacuum source to evacuate air from a second vacuum tube of the welding machine;

generating a vacuum in the second vacuum tube;

positioning a third region of the second fabric panel adjacent a perforated wall of the second vacuum tube;

drawing the third region of the second fabric panel into contact with the perforated wall of the second vacuum tube with the vacuum in the second vacuum tube; and welding the first region and the second region together.

18. The method as defined in claim 17, further comprising the steps of:

blowing heated air from a nozzle on the welding head between the overlapped first and second regions of the first and second fabric panels disposed on the first vacuum tube;

heating the overlapped first and second regions; and expelling the heated air into a gap between the first and second vacuum tubes.

19. The method of welding as defined in claim 17, further comprising the step of:

positioning a top wall of the first vacuum tube at a higher elevation vertically than a top wall of the second vacuum tube.

20. The method of welding as defined in claim 17, further comprising the step of:

positioning a top wall of the first vacuum track at the same height as a top wall of the second vacuum tube.

21. The method of welding as defined in claim 1, further comprising the steps of:

increasing or decreasing the length of the first vacuum tube by joining at least one vacuum tube segment in end-to-end relationship with an end of the first vacuum tube or removing at least one vacuum tube segment from the end of the first vacuum tube; and increasing or decreasing the length of a guiding track by joining at least one track segment in end-to-end relationship with an end of the guiding track or removing at least one track segment from the end of the guiding track.

22. The method of welding as defined in claim 4, further comprising the step of:

expelling the heated air into a gap defined between the first and second vacuum tubes.

* * * * *